US011049107B2

(12) United States Patent
Kim et al.

(10) Patent No.: US 11,049,107 B2
(45) Date of Patent: Jun. 29, 2021

(54) ELECTRONIC DEVICE AND USER AUTHENTICATION METHOD THEREOF

(71) Applicant: Samsung Electronics Co., Ltd., Suwon-si (KR)

(72) Inventors: In Ho Kim, Suwon-si (KR); Seung Won Oh, Suwon-si (KR); Yong Wan Lee, Suwon-si (KR); Moon Soo Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 527 days.

(21) Appl. No.: 15/224,858

(22) Filed: Aug. 1, 2016

(65) Prior Publication Data

US 2017/0053285 A1    Feb. 23, 2017

(30) Foreign Application Priority Data

Aug. 19, 2015 (KR) .................. 10-2015-0117015

(51) Int. Cl.
*G06Q 20/38* (2012.01)
*G06Q 20/40* (2012.01)
(Continued)

(52) U.S. Cl.
CPC ... *G06Q 20/40145* (2013.01); *G06Q 20/3224* (2013.01); *G06Q 20/3674* (2013.01); *G06Q 20/3829* (2013.01); *G06Q 20/38215* (2013.01)

(58) Field of Classification Search
CPC .................................................. G06Q 20/042
(Continued)

(56) References Cited

U.S. PATENT DOCUMENTS 5,590,197 A * 12/1996 Chen ...................... G06Q 20/04
380/30
5,668,876 A    9/1997 Falk et al.
(Continued)

FOREIGN PATENT DOCUMENTS

KR    10-0339967 B1    11/2002

OTHER PUBLICATIONS

Bohn: "Samsung Pay works almost anywhere your credit card does—The Verge", Aug. 13, 2015 (Aug. 13, 2015), XP055483240.
(Continued)

*Primary Examiner* — Chinedu C Agwumezie
(74) *Attorney, Agent, or Firm* — Jefferson IP Law, LLP

(57) ABSTRACT

An electronic device is provided. The electronic device includes a communication module, a memory configured to store payment information registered in a payment application, and a processor. The processor is configured to select at least one of a plurality of authentication servers based on the payment information, receive authentication information from the at least one authentication server by using the communication module, select at least one payment information of the payment information registered in the payment application based on a user input, select first authentication information, which corresponds to the selected payment information, from among the authentication information, and send second authentication information, which is generated based on the selected first authentication information, to the at least one authentication server corresponding to the selected first authentication information.

17 Claims, 11 Drawing Sheets

(51) Int. Cl.
*G06Q 20/32* (2012.01)
*G06Q 20/36* (2012.01)

(58) Field of Classification Search
USPC ..................................................... 705/77, 71
See application file for complete search history.

(56) References Cited

U.S. PATENT DOCUMENTS

| | | |
|---|---|---|
| 7,343,351 B1 | 3/2008 | Bishop et al. |
| 7,469,151 B2 | 12/2008 | Khan et al. |
| 7,801,827 B2 | 9/2010 | Bishop et al. |
| 8,165,635 B2 | 4/2012 | Khan et al. |
| 8,214,299 B2 | 7/2012 | Bishop et al. |
| 8,924,310 B2 | 12/2014 | Bishop et al. |
| 8,938,402 B2 | 1/2015 | Bishop et al. |
| 2004/0243520 A1 | 12/2004 | Bishop et al. |
| 2008/0058014 A1 | 3/2008 | Khan et al. |
| 2009/0164322 A1 | 6/2009 | Khan et al. |
| 2009/0327131 A1 | 12/2009 | Beenau et al. |
| 2010/0242092 A1* | 9/2010 | Harris .................. G06F 21/53 726/3 |
| 2010/0312667 A1 | 12/2010 | Bishop et al. |
| 2012/0240227 A1 | 9/2012 | Bishop et al. |
| 2012/0253978 A1 | 10/2012 | Bishop et al. |
| 2012/0259734 A1 | 10/2012 | Bishop et al. |
| 2012/0265690 A1 | 10/2012 | Bishop et al. |
| 2012/0271771 A1 | 10/2012 | Bishop et al. |
| 2012/0317035 A1* | 12/2012 | Royyuru ................ G06Q 30/06 705/71 |
| 2013/0325662 A1* | 12/2013 | Zizka .................... G06Q 30/06 705/26.41 |
| 2014/0089194 A1* | 3/2014 | Balasubramanian .. G06Q 20/40 705/44 |
| 2014/0189360 A1 | 7/2014 | Baghdasaryan et al. |
| 2014/0282902 A1* | 9/2014 | Zou ..................... H04L 63/0876 726/4 |
| 2014/0351147 A1 | 11/2014 | Castrechini et al. |
| 2015/0220713 A1 | 8/2015 | Beenau et al. |
| 2015/0227906 A1 | 8/2015 | Castrechini et al. |

OTHER PUBLICATIONS

First Data: "First Data enables industry payment innovation with Apple pay" , Sep. 11, 2014 (Sep. 11, 2014) , XP055483531.

Samsung: "Samsung Pay—Safe and secure mobile payments virtually anywhere you can swipe your card", Aug. 13, 2015 (Aug. 13, 2015), XP055483315.

Bmo Bank of Montreal et al: "Payments Security White Paper", Newstex Finance & Accounting Blogs, Jul. 13, 2015 (Jul. 13, 2015), XP055483345.

\* cited by examiner

| FINANCE ID | SERVER INFO |
|---|---|
| Samsung | URI 1 |
| Hyundai | URI 1 |
| City | URI 2 |
| Hana | URI 2, URI 3 |
| Visa | URI 3 |
| American Express | URI 2 |
| ... | ... |

FIG. 5

| CHALLENGE INFO | SERVER INFO | FINANCE ID |
|---|---|---|
| C1 | URI 1 | Samsung, Hyundai |
| C3 | URI 3 | Visa |

FIG. 7

ELECTRONIC DEVICE AND USER AUTHENTICATION METHOD THEREOF

CROSS-REFERENCE TO RELATED APPLICATION(S)

This application claims the benefit under 35 U.S.C. § 119(a) of a Korean patent application filed on Aug. 19, 2015 in the Korean Intellectual Property Office and assigned Serial number 10-2015-0117015, the entire disclosure of which is hereby incorporated by reference.

TECHNICAL FIELD

The present disclosure relates to a user authentication method using an electronic device.

BACKGROUND

Electronic devices are implemented in various forms and include, for example, a smartphone that a user carries, a wearable device that is attached to a body part of a user, and the like. With the development of information technologies (IT), the electronic devices have significantly superior functions and provide a user with various functions, for example, a multimedia service (e.g., a music service, a video service, or a digital broadcast service), a call service, a wireless Internet service, a short message service (SMS), a multimedia messaging service (NAB), or the like.

Nowadays, financial technology (hereinafter referred to as "Fin-tech"), which is a combination of finance technology and IT, gets attention. The Fin-tech that is evaluated as the financial paradigm shift extends its boundary to an off-line financial service and a finance platform building service as well as an on-line financial service, according to the related art.

With the development of Fin-tech, various types of financial services are provided through a payment application. A credit card company performs user authentication used for a financial service in conjunction with an external authentication server. Accordingly, it is difficult to quickly provide the user authentication service because the user is authenticated through the external authentication server. In the case where a user registers card information of a plurality of credit card companies in a payment application, an electronic device authenticates a user in conjunction with authentication servers for respective credit card companies, and thus it is difficult to manage authentication information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that quickly performs user authentication and effectively manages authentication information used during the user authentication and a user authentication method thereof.

In accordance with an aspect of the present disclosure, an electronic device is provided. The electronic device includes a communication module, a memory configured to store payment information registered in a payment application, and a processor. The processor is configured to select at least one of a plurality of authentication servers based on the payment information, receive authentication information from the at least one authentication server by using the communication module, select at least one payment information of the payment information registered in the payment application based on a user input, select first authentication information, which corresponds to the selected payment information, from among the authentication information, and send second authentication information, which is generated based on the selected first authentication information, to the at least one authentication server corresponding to the selected first authentication information.

In accordance with an aspect of the present disclosure, an electronic device is provided. The electronic device includes a communication module, a memory configured to store first authentication information corresponding to first payment information registered in a payment application and second authentication information corresponding to second payment information registered in the payment application, and a processor. The processor is configured to execute the payment application, select one payment information of the first payment information and the second payment information through the payment application based on a user input, select authentication information, which corresponds to the selected payment information, from among the first authentication information and the second authentication information, generate third authentication information based on the selected authentication information, and send the third authentication information to an authentication server corresponding to the selected authentication information by using the communication module.

In accordance with an aspect of the present disclosure, a non-transitory computer-readable recording medium having recorded thereon a method to be executed by a processor, is provided. The method includes selecting at least one authentication server of a plurality of authentication servers based on payment information registered in a payment application, receiving authentication information from the at least one authentication server, selecting at least one payment information of the payment information registered in the payment application based on a user input, selecting first authentication information, which corresponds to the selected payment information, from among the authentication information, and sending second authentication information generated based on the selected first authentication information to the at least one authentication server corresponding to the selected first authentication information.

In accordance with an aspect of the present disclosure, a non-transitory computer-readable recording medium having recorded thereon a method to be executed by a processor, is provided. The method includes executing a payment application, storing first authentication information corresponding to first payment information registered in the payment application and second authentication information corresponding to second payment information registered in the payment application, selecting one payment information of the first payment information and the second payment information through the payment application based on a user input, selecting authentication information, which corresponds to the selected payment information, from among the first authentication information and the second authentication information, generating third authentication information based on the selected authentication information, and sending the third authentication information to an authentication server corresponding to the selected authentication information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table illustrating an example of first mapping information, according to an embodiment of the present disclosure;

FIG. 7 is a table illustrating an example of second mapping information, according to an embodiment of the present disclosure;

Throughout the drawings, it should be noted that like reference numbers are used to depict the same or similar elements, features, and structures.

DETAILED DESCRIPTION

Figure 1:
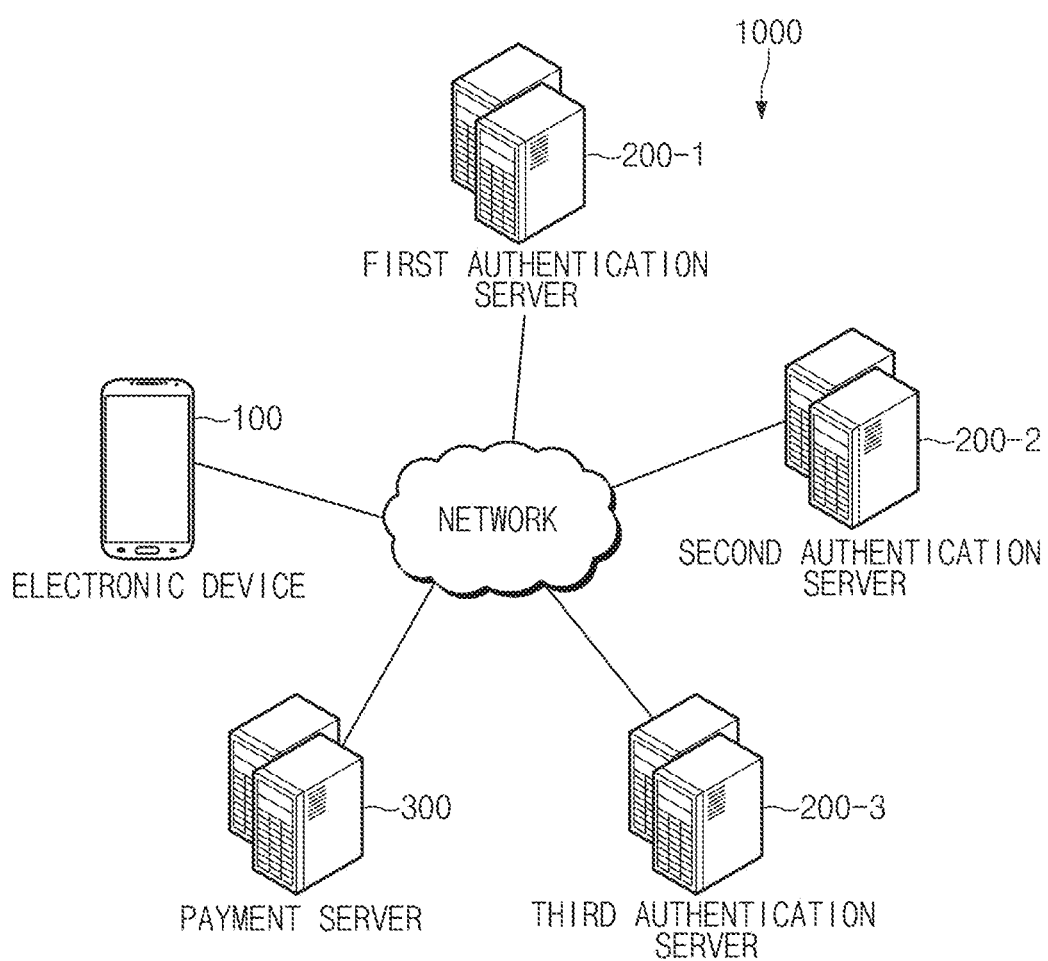
FIG. 1 is a diagram illustrating a configuration of an authentication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise Thus, for example, reference to "a component surface" includes reference to one or more of such surfaces.

In the disclosure disclosed herein, the expressions "have," "may have," "include," "comprise," "may include," and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, and the case (3) where bath of at least one A and at least one B are included.

The terms, such as "first," "second," and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element, or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) Audio Layer 3 (MP3) players, mobile medical devices, cameras, and wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), and a bio-implantable type of a device (e.g., implantable circuit).

According to another embodiment, the electronic device may be a home appliance. Examples of home appliances may include at least one of, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, the electronic device may include at least one of a medical device e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MM), a computed tomography (CT), scanners, and ultrasonic devices), a navigation device, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), and internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic device may include at least one of parts of furniture or buildings/structures, electronic boards, an electronic signature receiving device, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a diagram illustrating a configuration of an authentication system according to an embodiment of the present disclosure.

Referring to FIG. 1, an authentication system 1000 may include an electronic device 100, a plurality of authentication servers 200-1, 200-2, and 200-3, and a payment server 300. Elements included in the authentication system 1000 illustrated in FIG. 1 may be connected with each other through a network. For example, the electronic device 100, the plurality of authentication servers 200-1, 200-2, and 200-3, and the payment server 300 may be connected with each other through a mobile communication network or an Internet network.

According to an embodiment, the electronic device 100 may be a user device that a user, who wants to perform user authentication, uses. The user may perform user authentication by using the electronic device 100 and may use a payment service (e.g., a payment, a deposit and withdrawal, or remittance) on-line or off-line based on the user authentication. According to an embodiment, the electronic device 100 may manage card information (or account information) associated with a payment service account (e.g., a Samsung account), a user authentication service account (e.g., a fast identity online (FIDO) account), and a payment service account.

According to an embodiment, the electronic device 100 may provide a payment service by using a payment application (e.g., Samsung Pay™ application). According to an embodiment, the electronic device 100 may exchange information for user authentication or payment with an external device (e.g., the authentication servers 200-1, 200-2, and 200-3 or the payment server 300) through the payment application. For example, the payment application may provide a user with a user interface for registering payment information (e.g., card information or account information), managing the payment information, and making a payment. According to an embodiment, the electronic device 100 may perform biometric authentication by using a biometric authentication application (or a client). The biometric authentication may be an authentication method using the biometric information of a user and may include, for example, fingerprint authentication, iris authentication, face authentication, voice authentication, and the like. The biometric authentication application may provide a user with a user interface for registering the biometric information, managing the biometric information, and performing biometric authentication.

According to an embodiment, if a payment request is received from a user, the electronic device 100 may perform user authentication through an authentication server, which corresponds to payment information, from among the plurality of authentication servers 200-1, 200-2, and 200-3. According to an embodiment, the electronic device 100 may perform user authentication by using a challenge value (e.g., a disposable random value) (or authentication information) received from the authentication server, According to an embodiment, the electronic device 100 may previously receive a challenge value from at least some of the plurality of authentication servers 200-1, 200-2, and 200-3 and may store the challenge value therein.

According to an embodiment, each of the plurality of authentication servers 200-1, 200-2, and 200-3 may perform user authentication in response to a request of the electronic device 100. According to an embodiment, each of the plurality of authentication servers 200-1, 200-2, and 200-3 may perform user authentication in conjunction with at least one finance company (e.g., a card company or a bank). According to an embodiment, each of the plurality of authentication servers 200-1, 200-2, and 200-3 may perform user authentication associated with the finance company interworked. For example, in the case where a Samsung card company makes a contract with a certificate authority that manages the first authentication server 200-1 and where a Visa card company makes a contract with another certificate authority that manages the third authentication server 200-3, the electronic device 100 may perform user authentication through the first authentication server 200-1 if a user makes a payment by using the Samsung card or may perform user authentication through the third authentication server 200-3 if the user makes the payment by using the Visa card.

According to an embodiment, the plurality of authentication servers 200-1, 200-2, and 200-3 may manage card information (or account information) associated with a payment service account (e.g., a Samsung account), a user authentication service account (e.g., the FIDO account), and a payment service account. According to an embodiment, the plurality of authentication servers 200-1, 200-2, and 200-3 may exchange information, which is used during user authentication, with the electronic device 100. According to an embodiment, each of the plurality of authentication servers 200-1, 200-2, and 200-3 may send a challenge value (or authentication information) to the electronic device 100 in response to a request of the electronic device 100.

According to an embodiment, each of the plurality of authentication servers 200-1, 200-2, and 200-3 may send a validity period of the challenge value to the electronic device 100. For example, each of the plurality of authentication servers 200-1, 200-2, and 200-3 may send the validity period of the challenge value together with the challenge value. As another example, each of the plurality of authentication servers 200-1, 200-2, and 200-3 may send the validity period of the challenge value that is independent of the challenge value. According to an embodiment, the plurality of authentication servers 200-1, 200-2, and 200-3 may set different validity periods with respect to challenge values, respectively. According to an embodiment, each of the plurality of authentication servers 200-1, 200-2, and 200-3 may change the validity period of the challenge value. According to an embodiment, if the validity period of the challenge value is changed, each of the plurality of authentication servers 200-1, 200-2, and 200-3 may send the changed validity period to the electronic device 100. According to an embodiment, when sending the challenge value, each of the plurality of authentication servers 200-1, 200-2, and 200-3 may send a biometric authentication method corresponding to the challenge value to the electronic device 100 together. According to an embodiment, each of the plurality of authentication servers 200-1, 200-2, and 200-3 may receive an encrypted challenge value from the electronic device 100.

According to an embodiment, each of the plurality of authentication servers 200-1, 200-2, and 200-3 may provide a FIDO authentication service for performing user authentication based on the biometric information of a user. According to an embodiment, if receiving the encrypted challenge value from the electronic device 100, each of the plurality of authentication servers 200-1, 200-2, and 200-3 may perform the user authentication based on the encrypted challenge value. For example, if receiving a challenge value, which is encrypted based on a private key of asymmetric keys, from the electronic device 100, each of the plurality of authentication servers 200-1, 200-2, and 200-3 may decrypt the encrypted challenge value based on a public key. According to an embodiment, if the user authentication is completed, each of the plurality of authentication servers 200-1, 200-2, and 200-3 may send the authentication result to the electronic device 100.

According to an embodiment, each of the plurality of authentication servers 200-1, 200-2, and 200-3 may operate with each of the plurality of authentication servers 200-1, 200-2, and 200-3 divided into a plurality of servers. For example, each of the authentication servers 200-1, 200-2, and 200-3 may operate with each of the authentication servers 200-1, 200-2, and 200-3 divided into a user authentication server that performs user authentication and a certification agency server that manages account information and exchanges information between the electronic device 100 and a user authentication server.

According to an embodiment, the payment server 300 may exchange information, which is used during a payment process, with the electronic device 100. According to an embodiment, the payment server 300 may manage card information (or account information) associated with a payment service account (e.g., a Samsung account), a user authentication service account (e.g., the MO account) and a payment service account.

According to an embodiment, the payment server 300 may manage first mapping information in which information about a finance company and information about an authentication server associated with the finance company are mapped. The information about the authentication server may be, for example, a uniform resource identifier (URI) address of the authentication server. The information about the finance company may be, for example, identification information (e.g., the name of the finance company or the identifier of the finance company) for identifying the finance company. According to an embodiment, the payment server 300 may send the first mapping information to the electronic device 100 in response to a request of the electronic device 100. According to an embodiment, if the first mapping information is updated, the payment server 300 may send the updated first mapping information to the electronic device 100. According to an embodiment, the payment server 300 may send the updated first mapping information to the electronic device 100 in response to a request of the electronic device 100. According to an embodiment, the payment server 300 may periodically send the latest first mapping information to the electronic device 100 based on a specific update period.

Figure 2:
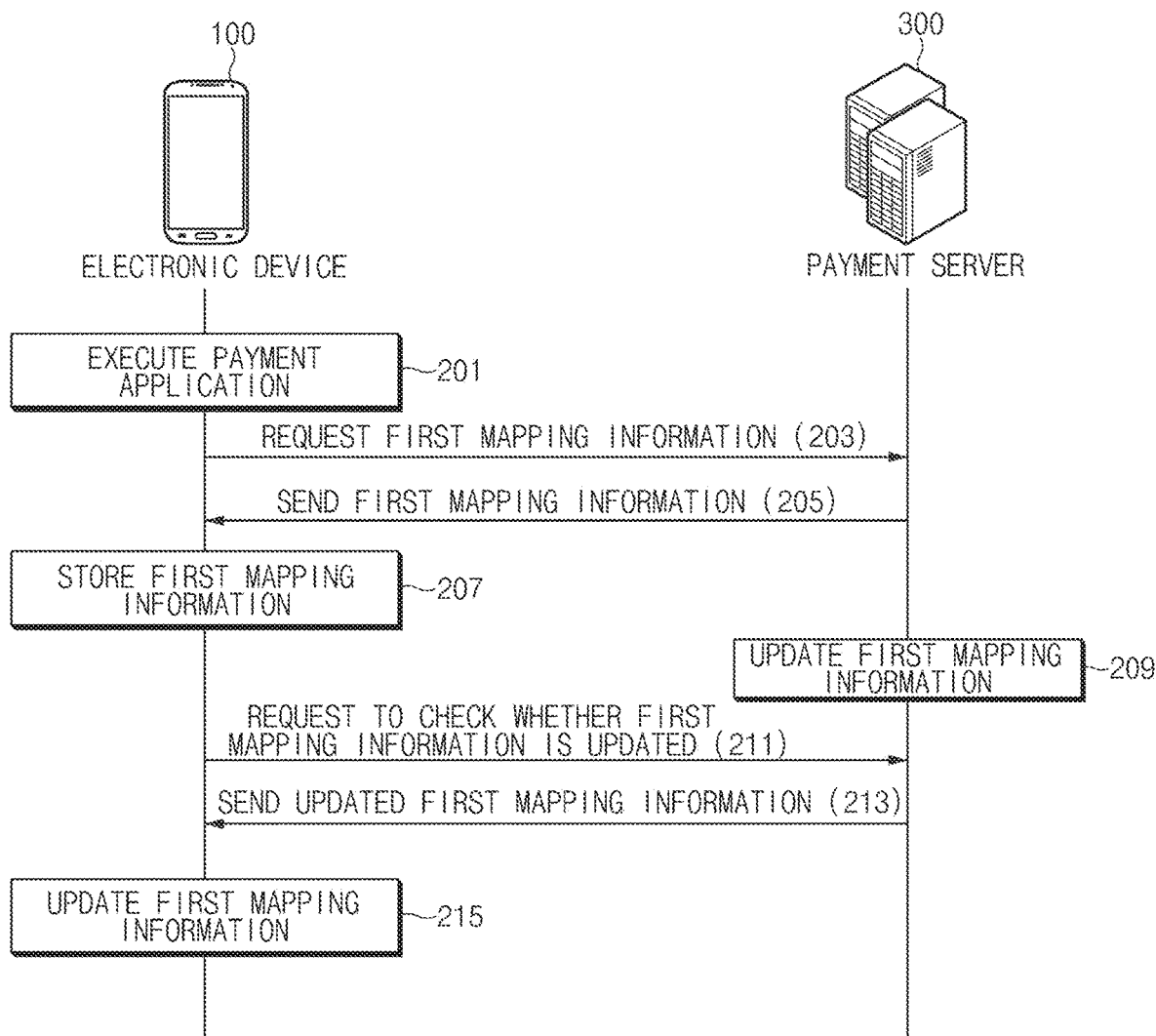
FIG. 2 is a view illustrating a first mapping information managing method of an authentication system according to an embodiment of the present disclosure.

FIG. 2 is a view illustrating a first mapping information managing method of an authentication system according to an embodiment of the present disclosure.

Referring to FIG. 2, in operation 201, the electronic device 100 may execute a payment application. According to an embodiment, if a user input for executing a payment application is received or if a payment event (e.g., a payment request from another application) is generated, the electronic device 100 may execute the payment application.

According to an embodiment, in operation 203, the electronic device 100 may request first mapping information from the payment server 300. The first mapping information may be, for example, information in which information about a finance company and information about an authentication server associated with the finance company are mapped. According to an embodiment, the first mapping information may include information about all financial companies and the information about the authentication server associated with the finance company supported at the payment application.

According to an embodiment, in operation 205, the payment server 300 may send the first mapping information to the electronic device 100.

According to an embodiment, in operation 207, the electronic device 100 may store the first mapping information. According to an embodiment, the electronic device 100 may store the first mapping information in the form of a table.

According to an embodiment, in operation 209, the payment server 300 may update the first mapping information. For example, in the case where a finance company changes an authentication server, the first mapping information may be updated.

According to an embodiment, in operation 211, the electronic device 100 may request the payment server 300 to check whether the first mapping information is updated. For example, if a payment application is executed, the electronic device 100 may request the payment server 300 to check whether the first mapping information is updated. As another example, while the payment application is executed, the electronic device 100 may periodically (e.g., every day) request the payment server 300 to check whether the first mapping information is updated. According to an embodiment, the request for an update check may include version information or a latest update date of the first mapping information stored in the electronic device 100.

According to an embodiment, if the first mapping information is updated, the payment server 300 may send information associated with the update check to the electronic device 100 in the form of a push message. According to an embodiment, the payment server 300 may periodically synchronize an update context with the electronic device 100 based on a synchronization policy.

According to an embodiment, in operation 213, the payment server 300 may send the updated first mapping information to the electronic device 100. According to an embodiment, the payment server 300 may determine whether the update of the first mapping information is needed, in response to the request for an update check of the electronic device 100. For example, the payment server 300 may determine whether the update of the first mapping information stored in the electronic device 100 is needed, by using the version information or the latest update date of the first mapping information included in the request for the update check. According to an embodiment, if the update of the first mapping information is determined as being needed, the payment server 300 may send the updated first mapping information to the electronic device 100.

According to an embodiment, in operation 215, if receiving the updated first mapping information from the payment server 300, the electronic device 100 may update the first mapping information by using the updated first mapping information. Accordingly, the electronic device 100 may store the latest first mapping information.

Figure 3:
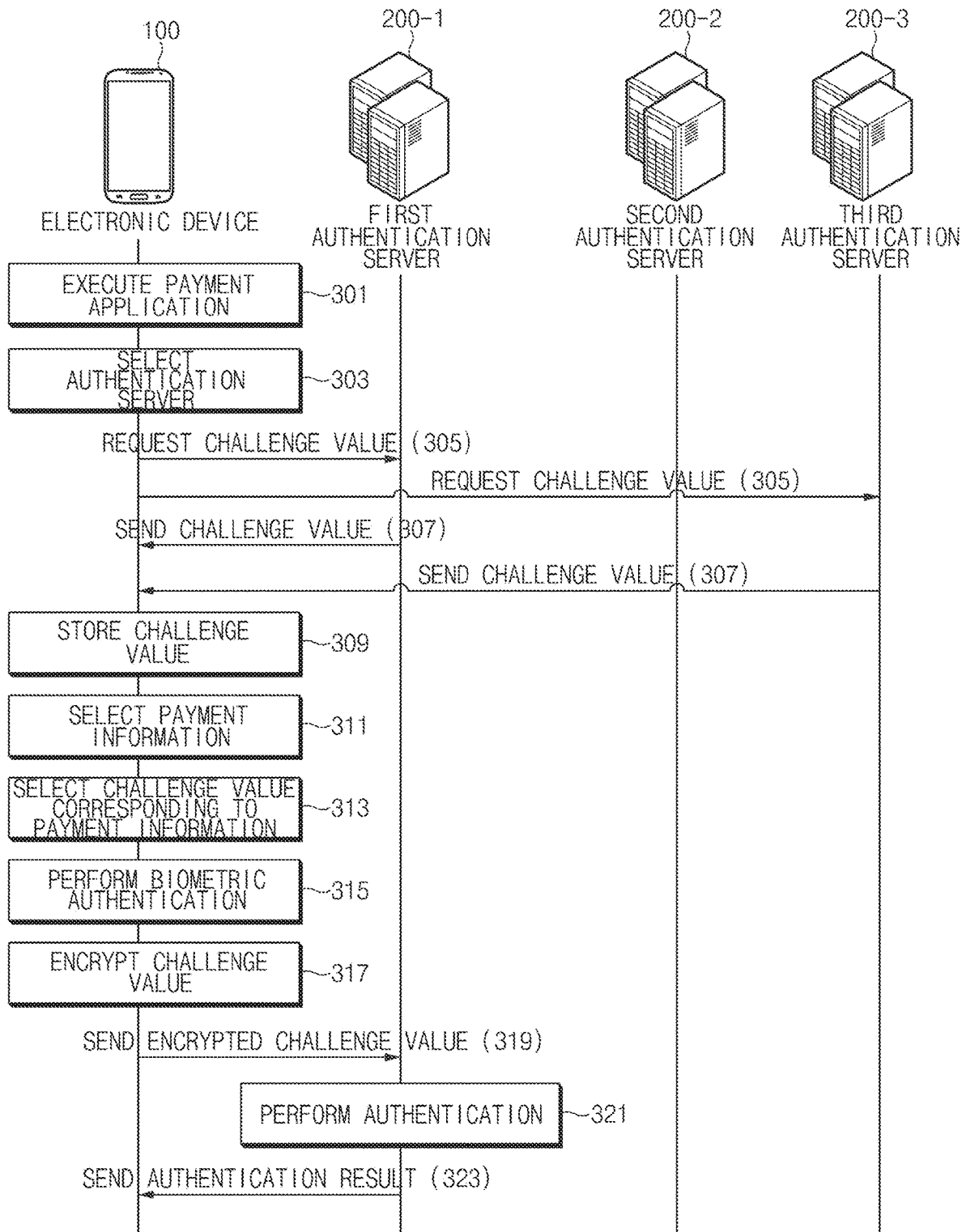
FIG. 3 is a view illustrating a user authentication method of an authentication system according to an embodiment of the present disclosure.

FIG. 3 is a view illustrating a user authentication method of an authentication system according to an embodiment of the present disclosure.

Referring to FIG. 3, in operation 301, the electronic device 100 may execute a payment application. According to an embodiment, if a user input for executing a payment application is received or if a payment event (e.g., a payment request from another application) is generated, the electronic device 100 may execute the payment application.

According to an embodiment, in operation 303, the electronic device 100 may select an authentication server, from which a challenge value is requested, based on payment information registered in the payment application. According to an embodiment, the electronic device 100 may select at least one (e.g., plurality) authentication server, from which the challenge value is requested, by using the first mapping information received from the payment server 300. According to an embodiment, the electronic device 100 may select at least one of the payment information registered in the payment application and may identify a finance company associated with the selected at least one payment information. According to an embodiment, the electronic device 100 may identify the authentication server mapped to the finance company by using the first mapping information.

According to an embodiment, in operation 305, the electronic device 100 may request the challenge value from the selected authentication server. For example, if the first authentication server 200-1 and the third authentication server 200-3 are selected as an authentication server associated with the payment information registered in the payment application, the electronic device 100 may request the challenge value from the first authentication server 200-1 and the third authentication server 200-3.

According to an embodiment, in operation 307, the selected at least one authentication server (e.g., the first authentication server 200-1 and the third authentication server 200-3) receiving the request for the challenge value may send the challenge value to the electronic device 100. According to an embodiment, the authentication server receiving the request for the challenge value may generate the challenge value having a random value and may send the generated challenge value to the electronic device 100. According to an embodiment, each of the authentication servers 200-1, 200-2, and 200-3 may set a designated validity period of the challenge value. According to an embodiment, when sending the challenge value, each of the authentication servers 200-1, 200-2, and 200-3 may send at least one of the validity period of the challenge value and a biometric authentication method corresponding to the challenge value together.

According to an embodiment, in operation 309, the electronic device 100 may store the challenge value received from the authentication server. According to an embodiment, the electronic device 100 may generate second mapping information by mapping the challenge value to information about an authentication server sending the challenge value and information about a finance company associated with the challenge value and may store the generated second mapping information. The information about the authentication server may be, for example, a URI address of the authentication server. The information about the finance company may be, for example, identification information (e.g., the name of the finance company or the identifier of the finance company) for identifying the finance company. According to an embodiment, the challenge value may be additionally mapped to at least one of the validity period and a biometric authentication method of the challenge value. According to an embodiment, the electronic device 100 may store the second mapping information in the form of a table.

According to an embodiment, at least one of operations 303, 305, 307, and 309 may be repeated. For example, if the payment application is executed, the electronic device 100 may identify an authentication server, from which the challenge value is requested, and may request the challenge value from the identified authentication server. As another example, if the validity period of the challenge value is expired, the electronic device 100 may again request the challenge value from the authentication server mapped to the challenge value, of which the validity period is expired, and may receive a new challenge value from the authentication server.

According to an embodiment, in operation 311, the electronic device 100 may select payment information used for a payment. For example, the electronic device 100 may select payment information used for the payment based on a user command for selecting the payment information. According to an embodiment, the electronic device 100 may display, on a display, a user interface including the payment information registered in the payment application. According to an embodiment, the electronic device 100 may receive the user command for selecting the payment information through the user interface.

According to an embodiment, in operation 313, the electronic device 100 may select the challenge value corresponding to the selected payment information. According to an embodiment, in operation 309, the electronic device 100 may check the challenge value corresponding to the payment information selected by using the second mapping information stored in the electronic device 100. For example, the electronic device 100 may identify a finance company associated with the selected payment information and may select the challenge value mapped to the identified finance company.

According to an embodiment, if the challenge value corresponding to the selected payment information is not stored therein, the electronic device 100 may request the challenge value from an authentication server associated with the selected payment information. For example, in the case where the selected payment information is associated with the second authentication server 200-2, the electronic device 100 may request the challenge value from the second authentication server 200-2.

According to an embodiment, in operation 315, the electronic device 100 may perform biometric authentication. For example, the electronic device 100 may perform the biometric authentication by recognizing biometric information of the user and comparing the recognized biometric information with previously registered biometric information. According to an embodiment, the electronic device 100 may perform biometric authentication by using a biometric authentication method corresponding to the selected challenge value.

According to an embodiment, in operation 317, the electronic device 100 may encrypt the challenge value. For example, the electronic device 100 may encrypt the challenge value by using a private key of a pair of an asymmetric key (or an encryption key) (e.g., the private key) and a public key that are associated with biometric authentication. According to an embodiment, the encryption method may include a signature. According to an embodiment, if the biometric authentication is completed, the electronic device 100 may access the private key.

In operation 319, the electronic device 100 may send the encrypted challenge value to an authentication server (e.g., the first authentication server 200-1) corresponding to the challenge value. According to an embodiment, in operation 309, the electronic device 100 may identify an authentication server, which sends the encrypted challenge value, by using the second mapping information stored in the electronic device 100.

In operation 321, the authentication server (e.g., the first authentication server 200-1) that receives the encrypted challenge value may perform user authentication by using the encrypted challenge value. For example, the first authentication server 200-1 may perform user authentication by decrypting the challenge value, which is encrypted by using the private key, by using the public key and comparing the decrypted challenge value with the challenge value stored in the first authentication server 200-1.

In operation 323, the first authentication server 200-1 may send the authentication result to the electronic device 100.

According to an embodiment described with reference to FIG. 3, the electronic device 100 may previously receive and store a challenge value. If a user requests a payment, the electronic device 100 may perform user authentication by using the previously stored challenge value. Accordingly, the electronic device 100 may quickly perform the user authentication.

Figure 4:
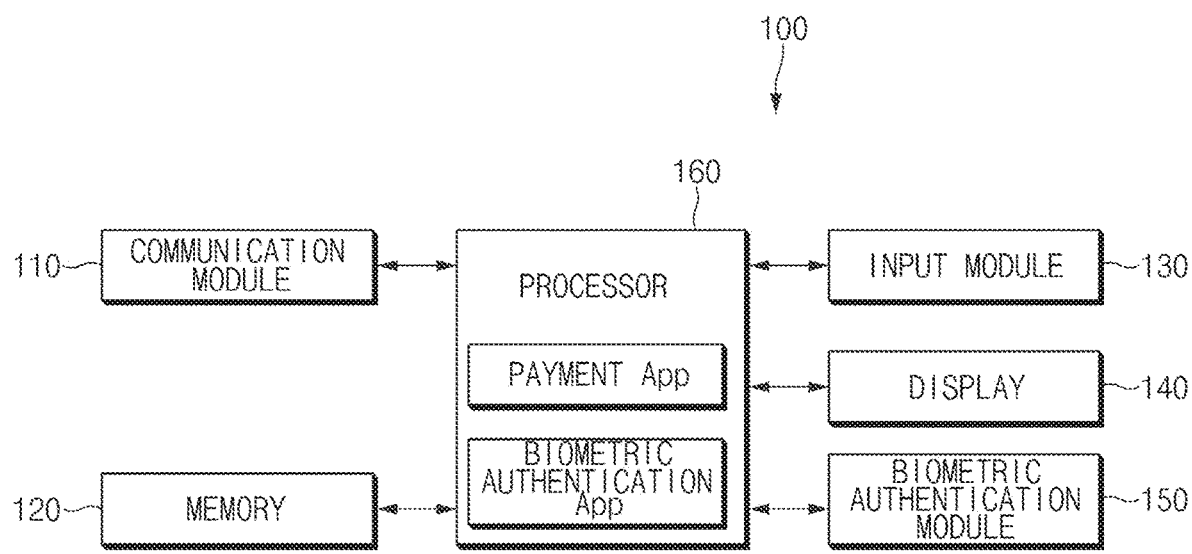
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, the electronic device 100 may include a communication module 110, a memory 120, an input module 130, a display 140, a biometric authentication module 150 and a processor 160. According to an embodiment, the communication module 110 may communicate with an external device. According to an embodiment, the communication module 110 may exchange information associated with user authentication with an external device (e.g., the authentication servers 200-1, 200-2, or 200-3, the payment server 300, and the like). According to an embodiment, the communication module 110 may send and receive data through a network (e.g., a mobile communication network or an Internet network). According to an embodiment, the communication module 110 may include a cellular module, a Wi-Fi module, a Bluetooth (BT) module, a near field communication (NFC) module, a magnetic secure transmission (MST) module, a global navigation satellite system (GNSS) module, and the like.

According to an embodiment, the memory 120 may store information associated with a payment or user authentication. According to an embodiment, the memory 120 may include a security module, which has a security higher than that of a general memory, such as an embedded secure element (eSE), an embedded subscriber identity module (eSIM), a trusted execution environment (TEE), or the like.

According to an embodiment, the memory 120 may store card information (or account information) associated with payment service account (e.g., a Samsung account), a user authentication service account (e.g., a FIDO account), a payment service account, the account of a finance company (e.g., a credit card company or a bank), and the like. According to an embodiment, the memory 120 may store biometric information registered by a user and authentication information (e.g., an asymmetric key) associated with biometric authentication.

According to an embodiment, the memory 120 may store the first mapping information and the second mapping information. The first mapping information may be, for example, information in which information about a financial company and information about an authentication server associated with the financial company are mapped. The information about the authentication server may be, for example, a URI address of the authentication server. The information about the finance company may be, for example, identification information (e.g., the name of the finance company or the identifier of the finance company)

for identifying the finance company. The second mapping information may be, for example, information in which information of the challenge value, information about an authentication server that sends the challenge value, and the financial company information associated with the challenge value are mapped. The second mapping information may further include, for example, at least one of the validity period of the challenge value and a biometric authentication method.

According to an embodiment, the input module 130 may receive a user command. In an embodiment, the input module 130 may include a touch sensor panel sensing a touch manipulation of a user or a pen sensor panel sensing a pen manipulation of a user. According to an embodiment, the input module 130 may sense a user manipulation inputted by a user with the user's finger or a pen spaced apart from a panel by a specific distance, as well as a user manipulation inputted when the user directly makes contact with the panel (e.g., a touch sensor panel or a pen sensor panel).

According to an embodiment, the display 140 may display a user interface. For example, the payment application may provide a user with a user interface, which is provided at a payment application, for registering the payment information (e.g., card information or account information), managing the payment information, and making a payment. According to an embodiment, the biometric authentication application may provide a user with a user interface for registering biometric information, managing the biometric information, and performing biometric authentication.

According to an embodiment, the biometric authentication module 150 may recognize biometric information (e.g., a fingerprint, an iris, a face, a voice, or the like) of a user and may perform user authentication by using the biometric information. According to an embodiment, the biometric authentication module 150 may include a fingerprint authentication module, an iris authentication module, a face authentication module, and a voice (or sound) authentication module.

According to an embodiment, the processor 160 may control overall operations of the electronic device 100. According to an embodiment, the processor 160 may perform user authentication by controlling each of the communication module 110, the memory 120, the input module 130, the display 140, and the biometric authentication module 150.

According to an embodiment, the processor 160 (e.g., an application processor) may be implemented with a system on chip (SoC) including a CPU, a graphic processing unit (GPU), a memory, and the like.

According to an embodiment, the processor 160 may execute a payment application According to an embodiment, if a user input for executing a payment application is received or if a payment event (e.g., a payment request from another application) is generated, the processor 160 may execute a payment application.

According to an embodiment, while the payment application is executed, the processor 160 may request the first mapping information from the payment server 300 through the communication module 110. According to an embodiment, if receiving the first mapping information from the payment server 300, the processor 160 may store the received mapping information in the memory 120.

According to an embodiment, while the payment application is executed, the processor 160 may send the request for an update check of the first mapping information to the payment server 300 through the communication module 110. For example, if a payment application is executed, the processor 160 may request the payment server 300 to check whether the first mapping information is updated, through the communication module 110. As another example, while the payment application is executed, the processor 160 may periodically (e.g., every day) request the payment server 300 to check whether the first mapping information is updated. According to an embodiment, if receiving the updated first mapping information from the payment server 300, the processor 160 may update the first mapping information stored in the memory 120 by using the updated first mapping information.

FIG. 5 is a table illustrating an example of first mapping information, according to an embodiment of the present disclosure.

Referring to FIG. 5, the first mapping information may include information about a finance company (FINANCE ID) and information about an authentication server (SERVER INFO). According to an embodiment, the first mapping information may include information about all financial companies, which a payment application supports, regardless of payment information registered in the payment application. For example, information about a finance company included in the first mapping information may include information about a finance company, which is not registered in the payment application, associated with payment information as well as information about a finance company, which is registered in the payment application, associated with the payment information. According to an embodiment, the first mapping information may include information about an authentication server mapped to the information about the finance company. The information about the authentication server may include information about an authentication server that performs user authentication in conjunction with each finance company. The information about the authentication server may be, for example, a URI (e.g., a uniform resource locator (URL) or a uniform resource name (URN)) address of the authentication server. The information about the finance company may be, for example, identification information (e.g., the name of the finance company or the identifier of the finance company) for identifying the finance company.

According to an embodiment, one finance company may be associated with a plurality of authentication servers. For example, information about one finance company included in the first mapping table may be mapped to information about a plurality of authentication servers.

Referring to FIG. 5, for example, information about a finance company 'Hana' may be mapped to information about the second authentication server 'https://fd.spay.co.kr/request' and information about the third authentication server 'https://fda.auth-pay.net/sign/.'

According to an embodiment, one authentication server may be associated with a plurality of financial companies. For example, information about one authentication server included in the first mapping table may be mapped to information about the plurality of finance companies.

Referring to FIG. 5, for example, information about an authentication server 'https://fido.gate.com/request' may be mapped to information about finance companies 'Samsung' and 'Hyundai.' As another example, the information about the authentication server 'https://fd.spay.co.kr/request' may be mapped to information about finance companies 'Samsung,' 'City,' 'Hana,' and 'American Express.'

According to an embodiment, if the payment application is executed, the processor 160 may request the challenge value from at least one authentication server (e.g., the first authentication server 100-1 and the third authentication server 100-3) through the communication module 110. According to an embodiment, the processor 160 may identify the at least one authentication server, from which the challenge value is requested, based on payment information registered in the payment application. According to an embodiment, the processor 160 may identify the at least one authentication server, from which the challenge value is requested, by using the first mapping information, Hereinafter, the process of identifying the at least one authentication server, from which the challenge value is requested, is described in detail.

According to an embodiment, the processor 160 may select at least one of payment information registered in the payment application. According to an embodiment, the processor 160 may select all payment information registered in the payment application. According to an embodiment, the processor 160 may select at least one of the payment information registered in the payment application based on at least one of a latest use record and a frequency of the use of the payment information. For example, the processor 160 may select the payment information, which was used most recently, of the designated number (e.g., three). As another example, the processor 160 may select the payment information used within a designated interval (e.g., recent one month). As still another example, the processor 160 may select the payment information, of which the frequency of the use is highest, of the designated number two). As yet another example, the processor 160 may select payment information of the designated number, of which the frequency of the use is highest, from among payment information used within a designated interval.

According to an embodiment, the processor 160 may select at least one payment information based on a designated priority. For example, the priority may be set by a user. According to an embodiment, the processor 160 may select at least one payment information based on a kind of payment application. According to an embodiment, the processor 160 may select at least one payment information based on the setting of a user.

According to an embodiment, the processor 160 may select at least one of payment information registered in the payment application based on a user command inputted through a user interface that the payment application provides. This will be described with reference to FIGS. 6A and 6B.

Figure 6A:
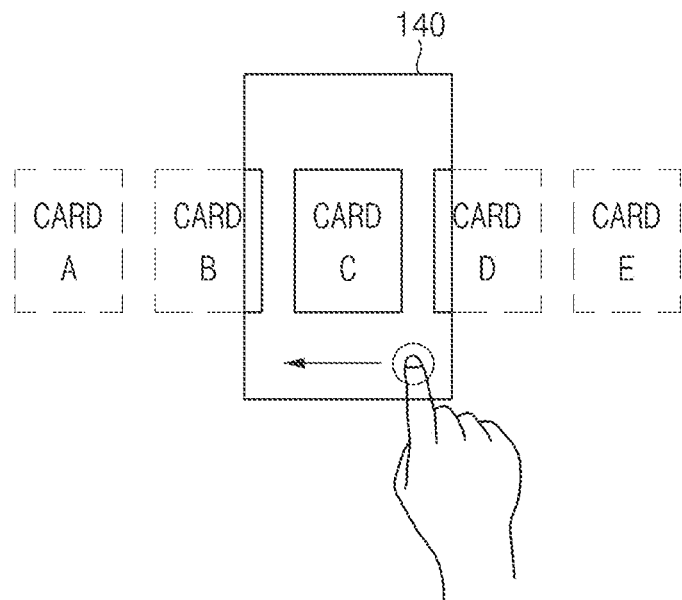
FIGS. 6A and 6B are views illustrating a user interface displayed on a display, according to an embodiment of the present disclosure.
Figure 6B:
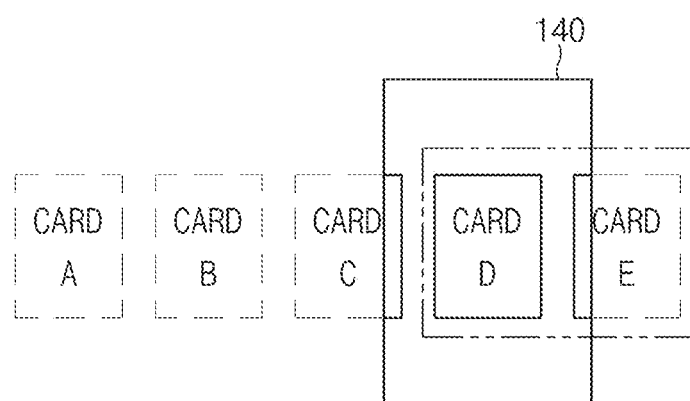

FIGS. 6A and 6B are views illustrating a user interface displayed on a display, according to an embodiment of the present disclosure.

According to an embodiment, the processor 160 may display a user interface, which a payment application provides, on the display 140. According to an embodiment, the user interface may include payment information registered in the payment application. According to an embodiment, the processor 160 may arrange (or, sort) payment information registered in the payment application. For example, referring to FIGS. 6A and 6B, the processor 160 may arrange (or, sort) payment information in a sequence of 'CARD A,' 'CARD B,' 'CARD C,' 'CARD D,' and 'CARD E.'

According to an embodiment, the processor 160 may change an arrangement order of the payment information based on the priority set by a user, a use record of the payment information, a kind of the payment application, the location of the electronic device 100, or additional information (e.g., a promotion, an event, recommendation, or the like) associated with a payment. For example, in the case where a user knows that the user can receive an additional discount benefit when a user makes a payment by using 'CARD C,' the processor 160 may change an arrangement order of the payment information such that 'CARD C' is preferentially displayed compared with another card. According to an embodiment, in the case where payment information that a user most frequently uses is 'CARD D,' the processor 160 may change an arrangement order of the payment information such that 'CARD D' is preferentially displayed compared with another card.

According to an embodiment, the processor 160 may display a user interface including a portion of payment information that is arranged on the display 140.

Referring to FIG. 6A, 'CARD C' may be displayed on the display 140. According to an embodiment, a user command, which is displayed on the display 140, for changing payment information may be inputted. For example, a user may input a left swipe manipulation.

According to an embodiment, if a user command is inputted, the processor 160 may change payment information included in a user interface into any other payment information and may display the changed payment information on the display 140.

Referring to FIG. 6B, if a left swipe manipulation is inputted, the payment information displayed on the display 140 may be changed to 'CARD D' that is placed in the tight direction of 'CARD C.' According to an embodiment, the processor 160 may select at least one of the payment information based on the direction for changing the payment information determined according to a user manipulation. For example, in the case where the payment information displayed on the display 140 is changed to 'CARD D' that is placed in the right direction of 'CARD C,' the processor 160 may select 'CARD D' or 'CARD E' that are placed in the direction for changing the payment information.

According to an embodiment, the processor 160 may select at least one of payment information registered in the payment application based on the current location of the electronic device 100 (or a place or a time). For example, in the case where the electronic device 100 is placed at a store that provides a discount benefit of a specific card, the processor 160 may select payment information for providing the discount benefit.

According to an embodiment, if the payment information is selected, the processor 160 may identify a finance company associated with the selected at least one payment information. According to an embodiment, the processor 160 may identify an authentication server mapped to the finance company by using the first mapping information. For example, Samsung cards 'CARD A' and 'CARD B,' Hyundai cards 'CARD C' and 'CARD D,' and a VISA card 'CARD E' may be registered in the payment application. In the case where all the registered cards are selected, the processor 160 may include information about a finance company 'Samsung,' 'Hyundai,' and 'Visa.' Referring to FIG. 4, the processor 160 may identify the first authentication server and the second authentication server mapped to 'Samsung,' the first authentication server mapped to 'Hyundai,' and the third authentication server mapped to 'Visa' by using the first mapping information.

According to an embodiment, the processor 160 may request the challenge value from the identified at least one authentication server through the communication module 110. According to an embodiment, in the case where there are a plurality of authentication servers mapped to one finance company, the processor 160 may request the challenge value from one of the authentication servers. For example, the processor 160 may request the challenge value from one of the first authentication server 200-1 and the second authentication server 200-2 associated with finance company 'Samsung.'

According to an embodiment, if receiving the challenge value from an authentication server, the processor 160 may store the received challenge value in the memory 120. According to an embodiment, the challenge value may be received in conjunction with a validity period and a biometric authentication method of the challenge value. According to an embodiment, the processor 160 may generate the second mapping information by mapping the received challenge value, information about an authentication server sending the challenge value, and information about a finance company thereto. The information about the authentication server may be, for example, a URI address of the authentication server. According to an embodiment, the challenge value may be additionally mapped to at least one of the validity period and a biometric authentication method of the challenge value. According to an embodiment, the processor 160 may store the second mapping information in the memory 120.

According to an embodiment, if the validity period of the challenge value is expired, the processor 160 may again request the challenge value from at least one authentication server through the communication module 110. According to an embodiment, if receiving a new challenge value from the at least one authentication server, the processor 160 may update the second mapping information by using the new challenge value.

FIG. 7 is a table illustrating an example of second mapping information, according to an embodiment of the present disclosure.

Referring to FIG. 7, the second mapping information may include information of a challenge value (CHALLENGE INFO), information about an authentication server (SERVER INFO), and information about a finance company (FINANCE ID). According to an embodiment, the second mapping information may include information about an authentication server that sends a challenge value.

Referring to FIG. 7, challenge value 'C1' received from a first authentication server may be mapped to information about an authentication server 'https://fido.gate.com/request,' and challenge value 'C3' received from a third authentication server may be mapped to information about an authentication server 'https://fda.auth-pay.net/sign/.' According to an embodiment, the information about the finance company included in the second mapping information may include information about a finance company, which is associated with payment information selected to request the challenge value, from among payment information registered in a payment application. For example, Samsung cards 'CARD A' and 'CARD B,' Hyundai cards 'CARD C' and 'CARD D,' and a VISA card 'CARD E' may be registered in the payment application. In the case where all the registered cards are selected, the information about a finance company may include 'Samsung,' 'Hyundai,' and 'Visa.'

Referring to FIG. 7, since a Samsung credit card company and a Hyundai credit card company are associated with the first authentication server, information about finance companies 'Samsung' and 'Hyundai' may be mapped to the challenge value 'C1' received from the first authentication server. Since a Visa credit card company is associated with the third authentication server, information about a finance company may be mapped to the challenge value 'C3' received from the third authentication server. The information about the authentication server may be, for example, a URI address of the authentication server. The information about the finance company may be, for example, identification information (e.g., the name of the finance company or the identifier of the finance company) for identifying the finance company.

According to an embodiment, if receiving a user command for selecting payment information used for a payment, the processor 160 may perform authentication in conjunction with an authentication server corresponding to the challenge value by using the challenge value corresponding to the selected payment information. According to an embodiment, the processor 160 may select the challenge value corresponding to the payment information selected by using the second mapping information. For example, the processor 160 may identify the finance company associated with the selected payment information and may check the challenge value mapped to the identified finance company. For example, referring to FIG. 7, in the case where a user may select payment information 'CARD A' and 'CARD A' is a Samsung card, the processor 160 may select the challenge value 'C1' mapped to information about finance company 'Samsung.'

According to an embodiment, if the challenge value corresponding to the selected payment information is selected, the payment application may send the selected challenge value to a biometric authentication application. According to an embodiment, the processor 160 may perform biometric authentication by using the biometric authentication application. According to an embodiment, the processor 160 may perform the biometric authentication by comparing biometric information of a user, which is recognized by the biometric authentication module 150, with previously registered biometric information. According to an embodiment, the processor 160 may perform the biometric authentication by using a biometric authentication method corresponding to the selected challenge value.

According to an embodiment, if the biometric authentication is completed, the processor 160 may encrypt the challenge value by using a private key of a pair of an asymmetric key (or an encryption key) (e.g., the private key) and a public key associated with biometric authentication. According to an embodiment, an encryption method may include a signature. According to an embodiment, if the biometric authentication is completed, the processor 160 may access the private key.

According to an embodiment, the processor 160 may send the encrypted challenge value to an authentication server corresponding to the challenge value. According to an embodiment, the processor 160 may identify the authentication server mapped to the encrypted challenge value by using the second mapping information. For example, referring to FIG. 7, in the case where the challenge value 'C1' is encrypted, the processor 160 may check information about an authentication server 'URI 1' mapped to the challenge value 'C1' and may send the encrypted challenge value to the first authentication server 200-1 based on the checked result.

An electronic device according to an embodiment of the present disclosure may include a communication module, a memory configured to store payment information registered in a payment application, and a processor. The processor may be configured to select at least one of a plurality of authentication servers based on the payment information, receive authentication information from the at least one authentication server by using the communication module, select at least one payment information of the payment information registered in the payment application based on a user input, select first authentication information, which corresponds to the selected payment information, from among the authentication information, and send second authentication information, which is generated based on the selected first authentication information, to the at least one authentication server corresponding to the selected first authentication information.

According to an embodiment, the processor may be configured to execute the payment application before the at least one authentication server is selected.

According to an embodiment, the processor may be configured to request the authentication information from the at least one authentication server if the at least one authentication server is selected.

According to an embodiment, the first authentication information may include a challenge value, and the processor may be configured to generate the second authentication information by encrypting the challenge value.

According to an embodiment, the processor may be configured to perform biometric authentication corresponding to the selected first authentication information and to encrypt the challenge value by using an encryption key corresponding to the biometric authentication if the biometric authentication is completed.

According to an embodiment, the first authentication information may include a challenge value and a validity period of the challenge value.

According to an embodiment, if receiving first mapping information, in which information about a finance company and information about an authentication server associated with the finance company are mapped, from a payment server, the processor may be configured to store the first mapping information in the memory and select the at least one authentication server by using the first mapping information.

According to an embodiment, the processor may be configured to select at least one of the payment information registered in the payment application, identify the finance company associated with the selected at least one payment information, and select an authentication server mapped to the identified finance company.

According to an embodiment, the processor may be configured to select all the payment information registered in the payment application.

According to an embodiment, the processor may be configured to select at least one of the payment information registered in the payment application based on at least one of a latest use record and a frequency of the use of the payment information.

According to an embodiment, the electronic device may further include a display. The processor may be configured to arrange the payment information registered in the payment application, display a user interface including a portion of the arranged payment information on the display, change the payment information included in the user interface into any other payment information based on a user input and an arrangement order, and select at least one of the payment information based on a direction for changing the payment information.

According to an embodiment, if receiving updated first mapping information from the payment server, the processor may be configured to update the first mapping information stored in the memory by using the updated first mapping information.

According to an embodiment, the processor may be configured to generate second mapping information by mapping the first authentication information, information about an authentication server sending the first authentication information, and information about a finance company and store the second mapping information in the memory.

According to an embodiment, the processor may be configured to select the first authentication information corresponding to payment information selected by using the second mapping information.

According to an embodiment, the processor may be configured to identify an authentication server corresponding to the first authentication information selected by using the second mapping information.

An electronic device according to an embodiment of the present disclosure may include a communication module, a memory configured to store first authentication information corresponding to first payment information registered in a payment application and second authentication information corresponding to second payment information registered in the payment application, and a processor. The processor is configured to execute the payment application, select one payment information of the first payment information and the second payment information through the payment application based on a user input, select authentication information, which corresponds to the selected payment information, from among the first authentication information and the second authentication information, generate third authentication information based on the selected authentication information, and send the third authentication information to an authentication server corresponding to the selected authentication information by using the communication module.

According to an embodiment, the processor is configured to perform biometric authentication corresponding to the selected authentication information and generate third authentication information by encrypting the authentication information on the basis of an encryption key corresponding to the biometric authentication if the biometric authentication is completed.

According to an embodiment, the processor is configured to request authentication information from the authentication server if a validity period of the first authentication information or the second authentication information is expired and update the first authentication information or the second authentication information by using new authentication information if receiving the new authentication information from the authentication server.

An electronic device according to various embodiments of the present disclosure may include a communication module configured to communicate with an external device, a memory, an input module configured to receive a user command, and a processor. The processor is configured to select at least one authentication server, from which a challenge value is requested, based on payment information registered in a payment application, control the communication module such that the communication module requests the challenge value from the at least one authentication server, store the challenge value in the memory if receiving the challenge value from the at least one authentication server, and perform authentication with an authentication server corresponding to the challenge value by using the challenge value corresponding to the selected payment information if receiving a user command for selecting payment information used for a payment.

Figure 8:
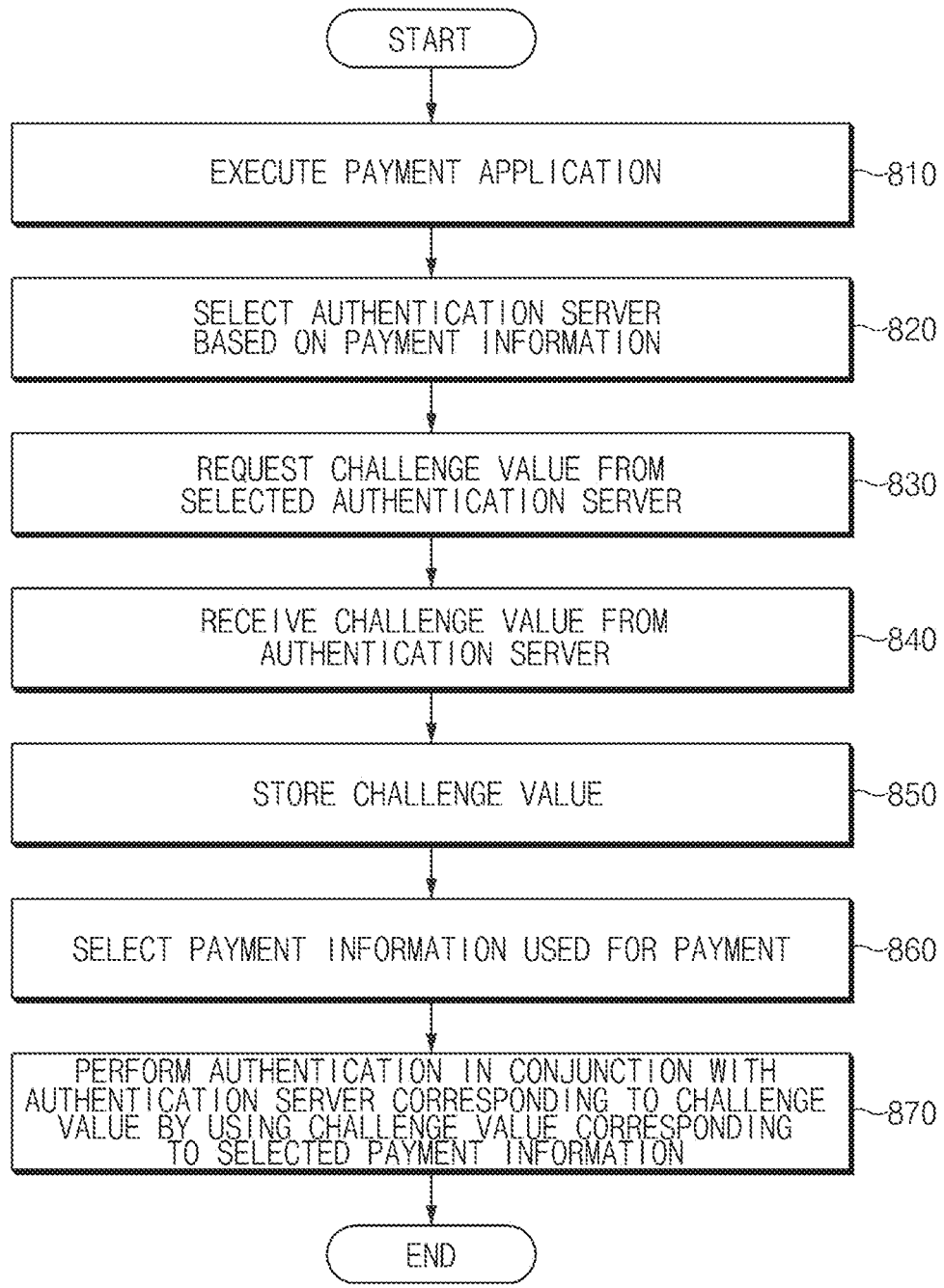
FIG. 8 is a flow chart illustrating a user authentication method of an electronic device according to an embodiment of the present disclosure.

FIG. 8 is a flow chart illustrating a user authentication method of an electronic device according to an embodiment of the present disclosure.

The flow chart illustrated in FIG. 8 may include operations that the electronic device 100 illustrated in FIGS. 1 to 4 processes. Even though omitted below, details about the electronic device 100 described with reference to FIGS. 1 to 5, 6A-6B, and 7 may be applied to the flowchart illustrated in FIG. 8.

Referring to FIG. 8, in operation 810, the electronic device 100 may execute a payment application. According to an embodiment, if a user input for executing a payment application is received or if a payment event (e.g., a payment request from another application) is generated, the electronic device 100 (e.g., the processor 160) may execute the payment application.

According to an embodiment, while the payment application is executed, the electronic device 100 (e.g., the communication module 110) may request first mapping information from a payment server. The first mapping information may be, for example, information in which information about a financial company and information about an authentication server associated with the financial company are mapped. According to an embodiment, if receiving the first mapping information from the payment server, the electronic device 100 (e.g., the processor 160) may store the received mapping information in a memory. According to an embodiment, while the payment application is executed, the electronic device 100 (e.g., the communication module 110) may send the request for an update check of the first mapping information to the payment server. According to an embodiment, if receiving the updated first mapping information from the payment server, the electronic device 100 (e.g., the processor 160) may update the first mapping information stored in the memory by using the updated first mapping information.

According to an embodiment, if receiving a portion of information (e.g., information about a finance company or information about an authentication server associated with the finance company), which is included in the first mapping information, from the payment server, the electronic device 100 (e.g., the processor 160) may generate the first mapping information or may update the first mapping information, based on the received information.

According to an embodiment, in operation 820, the electronic device 100 (e.g., the processor 160) may select an authentication server from which a challenge value is requested. According to an embodiment, the electronic device 100 may identify at least one (e.g., plurality) authentication server, from which the challenge value is requested, based on payment information registered in the payment application. According to an embodiment, the electronic device 100 may identify at least one authentication server, from which the challenge value is requested, by using the first mapping information. According to an embodiment, the electronic device 100 may select at least one of the payment information registered in the payment application and may identify a finance company associated with the selected at least one payment information. According to an embodiment, the electronic device 100 may identify the authentication server mapped to the finance company by using the first mapping information stored in the memory. According to an embodiment, the electronic device 100 may select all the payment information registered in the payment application. According to an embodiment, the electronic device 100 may select at least one of the payment information registered in the payment application based on at least one of a latest use record and a frequency of the use of the payment information. According to an embodiment, the electronic device 100 may select at least one of the payment information registered in the payment application based on a user command inputted through a user interface that the payment application provides. For example, the electronic device 100 may arrange (or, sort) the payment information registered in the payment application and may display a user interface including a portion of the arranged payment information. If receiving a user command for changing the payment information, the electronic device 100 may change the payment information included in the user interface into any other payment information and may display the changed payment information. The electronic device 100 may select at least one of the payment information based on the direction for changing the payment information.

According to an embodiment, in operation 830, the electronic device 100 (e.g., the communication module 110) may request a challenge value from the selected authentication server.

According to an embodiment, in operation 840, the electronic device 100 (e.g., the communication module 110) may receive the challenge value from the selected authentication server. According to an embodiment, the challenge value may be received in conjunction with a validity period and a biometric authentication method of the challenge value.

According to an embodiment, in operation 850, the electronic device 100 (e.g., the processor 160) may store the challenge value in the memory. According to an embodiment, the electronic device 100 may generate second mapping information by mapping the received challenge value, information about authentication server that sends the challenge value, and information about a finance company thereto. According to an embodiment, the second mapping information may further include at least one of the validity period and a biometric authentication method of the challenge value. According to an embodiment, the electronic device 100 may store the generated second mapping information in the memory.

According to an embodiment, if the validity period of the challenge value is expired, the electronic device 100 (e.g., the communication module 110) may again request the challenge value from the authentication server. According to an embodiment, if receiving a new challenge value from the authentication server, the electronic device 100 may update the second mapping information by using the new challenge value.

According to an embodiment, in operation 860, the electronic device 100 may select payment information used for a payment. For example, the electronic device 100 may select payment information used for a payment based on a user command for selecting payment information. According to an embodiment, the electronic device 100 may display, on a display, a user interface including the payment information registered in the payment application. According to an embodiment, the electronic device 100 may receive the user command for selecting the payment information through the user interface.

According to an embodiment, in operation 870, the electronic device 100 may perform authentication in conjunction with the authentication server corresponding to the challenge value by using the challenge value corresponding to the selected payment information. According to an embodiment, the processor 160 may check the challenge value corresponding to the payment information selected by using the second mapping information. According to an embodiment, the processor 160 may perform the biometric authentication by using a biometric authentication method corresponding to the checked challenge value. According to an embodiment, if the biometric authentication is completed, the electronic device 100 may encrypt the challenge value by using a private key of a pair of an asymmetric key (or an encryption key) (e.g., the private key) and a public key associated with a biometric authentication. According to an embodiment, the electronic device 100 may send the encrypted challenge value to an authentication server corresponding to the challenge value. For example, the electronic device 100 may identify the authentication server mapped to the challenge value by using the second mapping information.

A user authentication method of an electronic device according to various embodiments of the present disclosure is provided. The method includes executing a payment application, selecting at least one authentication server, from which a challenge value is requested, based on payment information registered in the payment application, requesting the challenge value from the at least one authentication server, storing the challenge value in a memory if receiving a challenge value from the at least one authentication server, receiving a user command for selecting payment information used for a payment, and performing authentication in conjunction with an authentication server corresponding to the challenge value by using a challenge value corresponding to the selected payment information.

According to an embodiment, the method may further include receiving, from a payment server, first mapping information obtained by mapping information about a finance company to information about an authentication server associated with a finance company and storing the first mapping information in the memory. The selecting of the at least one authentication server from which a challenge value is requested may include selecting at least one authentication server, from which a challenge value is requested, by using the first mapping information.

According to an embodiment, the selecting of the at least one authentication server from which a challenge value is requested may include selecting at least one of payment information registered in the payment application, identifying a finance company associated with the selected at least one payment information, and selecting an authentication server mapped to the identified finance company by using the first mapping information.

According to an embodiment, the selecting of the at least one of the payment information may include selecting all payment information registered in the payment application.

According to an embodiment, the selecting of the at least one of the payment information may include selecting at least one of the payment information registered in the payment application based on at least one of a latest use record and a frequency of the use of the payment information.

According to an embodiment, the selecting of the at least one of the payment information may include arranging the payment information registered in the payment application, displaying a user interface including a portion of the payment information arranged on the display, changing the payment information included in the user interface into any other payment information based on a user input and an arrangement order, and selecting at least one of the payment information based on the user input and a change direction of the payment information.

According to an embodiment, the method may further include receiving updated first mapping information from the payment server and updating the first mapping information stored in the memory by using the updated first mapping information.

According to an embodiment, the storing of the challenge value in the memory may include generating second mapping information by mapping the received challenge value, information about an authentication server sending the challenge value, and information about the finance company thereto and storing the second mapping information in the memory.

According to an embodiment, the performing of the authentication in conjunction with the authentication server corresponding to the challenge value may include checking the challenge value corresponding to the selected payment information, performing biometric authentication corresponding to the checked challenge value, signing the checked challenge value by using an encryption key corresponding to the biometric authentication if the biometric authentication is completed, and sending the signed challenge value to an authentication server mapped to the challenge value.

According to an embodiment, the method may further include again requesting a challenge value from the at least one authentication server, if a validity period of the challenge value is expired, and updating the second mapping information stored in the memory by using the new challenge value if receiving a new challenge value from the at least one authentication server.

Figure 9:
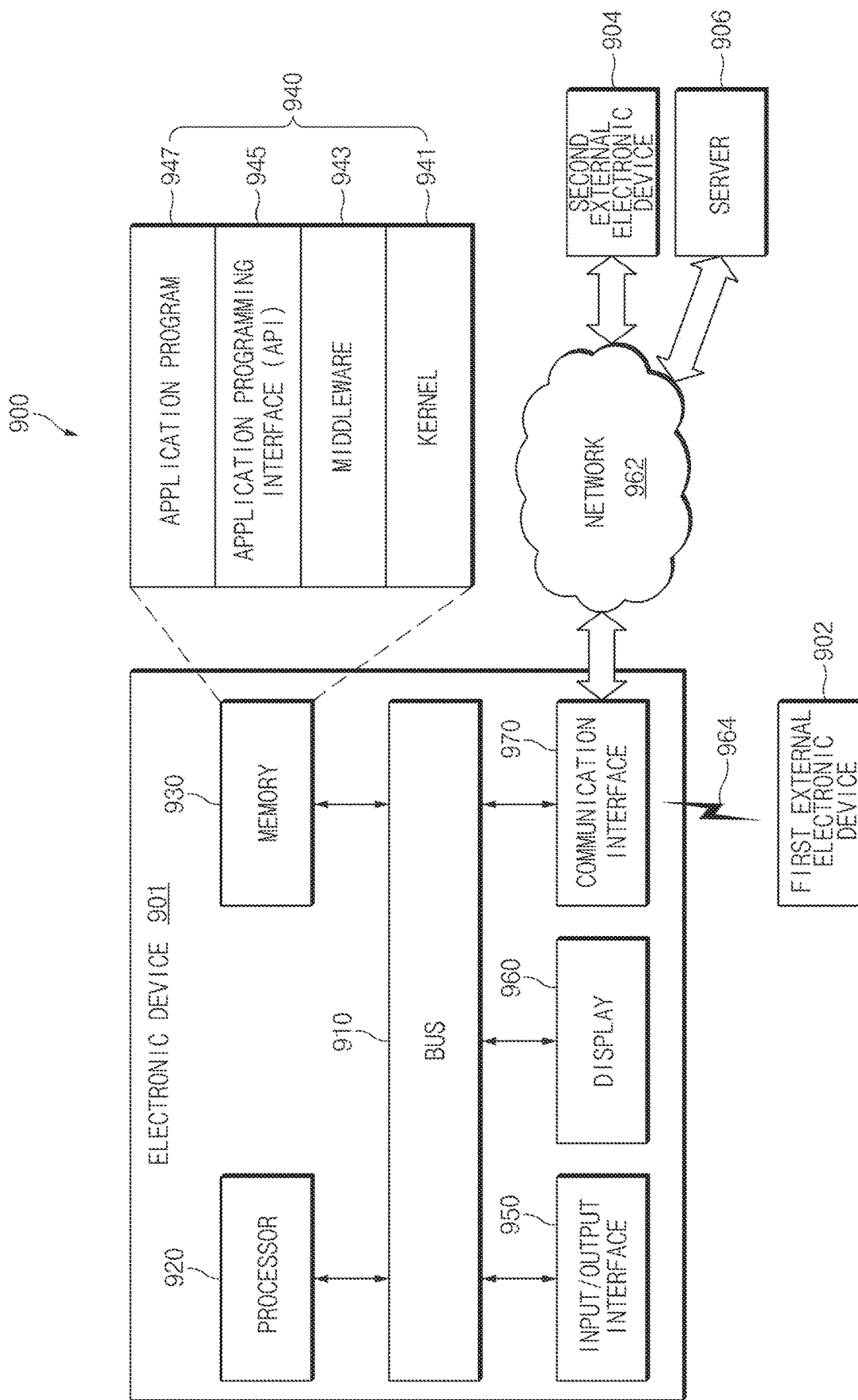
FIG. 9 is a diagram illustrating an electronic device in a network environment, according to an embodiment of the present disclosure.

FIG. 9 is a diagram illustrating an electronic device in a network environment, according to an embodiment of the present disclosure.

Referring to FIG. 9, there is illustrated an electronic device 901 in a network environment 900 according to various embodiments. The electronic device 901 may include, for example, all or a part of the electronic device 100 illustrated in FIG. 4. The electronic device 901 may include a bus 910, a processor 920, a memory 930, an input/output (I/O) interface 950, a display 960, and a communication interface 970. According to an embodiment, the electronic device 901 may not include at least one of the above-described elements or may further include other element(s).

For example, the bus 910 may interconnect the above-described elements 920, 930, 950, 960, and 970 and may include a circuit for conveying communications (e.g., a control message and/or data) among the above-described elements.

The processor 920 may include one or more of a CPU, an application processor (AP), or a communication processor (CP). The processor 920 may perform, for example, data processing or an operation associated with control or communication of at least one other element(s) of the electronic device 901.

The memory 930 may include a volatile and/or a nonvolatile memory. For example, the memory 930 may store instructions or data associated with at least one other element(s) of the electronic device 901. According to an embodiment, the memory 930 may store software and/or a program 940.

The program 940 may include, for example, a kernel 941, a middleware 943, an application programming interface (API) 945, and/or an application program (or "application") 947. At least a part of the kernel 941, the middleware 943, or the API 945 may be called an "operating system (OS)."

The kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform, for example, a mediation role such that the API 945 or the application program 947 communicates with the kernel 941 to exchange data. Furthermore, the middleware 943 may process one or more task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947 and may process the task requests.

The API 945 may be an interface through which the application program 947 controls a function provided by the kernel 941 or the middleware 943, and may include, for example, at least one interface or function (e.g., an instruction) for a file control, a window control, image processing, a character control, or the like.

The I/O interface 950 may transmit an instruction or data, input from a user or another external device, to other element(s) of the electronic device 901. Furthermore, the I/O interface 950 may output an instruction or data, received from other component(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a portion of a user's body.

The communication interface 970 may establish communication between the electronic device 901 and an external electronic device (e.g., a first external electronic device 902, a second external electronic device 904, or a server 906). For example, the communication interface 970 may be connected to a network 962 through wireless communication or wired communication to communicate with an external device (e.g., the second external electronic device 904 or the server 906).

The wireless communication may include at least one of, for example, a long-term evolution (LTE), an LTE advance (LTE-A), a code division multiple access (CDMA), a wideband CDMA (WCDMA), a universal mobile telecommunications system (UMTS), a wireless broadband (WiBro), a global system for mobile communications (GSM), or the like, as a cellular communication protocol. Furthermore, the wireless communication may include, for example, a local area network 964. The local area network 964 may include at least one of Wi-Fi, BT, BT low energy (BLE), Zigbee, NFC, the MST, or GNSS. The GNSS may include at least one of a GPS, a global orbiting navigation satellite system (GLONASS), a Beidou Navigation Satellite System (hereinafter referred to as "Beidou"), or a European global satellite-based navigation system (Galileo). In this specification, "GPS" and "GNSS" may be interchangeably used.

The wired communication may include at least one of, for example, a universal serial bus (USB), a high definition multimedia interface (HDMI), a recommended standard-232 (RS-232), a power line communication, a plain old telephone service (POTS), or the like. The network 962 may include at least one of telecommunications networks, for example, a computer network (e.g., local area network (LAN) or wireless area network (WAN)), an Internet, or a telephone network.

Each of the first and second external electronic devices 902 and 904 may be a device of which the type is different from or the same as that of the electronic device 901. According to an embodiment, the server 906 may include a group of one or more servers. According to various embodiments, all or a part of operations that the electronic device 901 will perform may be executed by another or plural electronic devices (e.g., the first and second external electronic devices 902 and 904 or the server 906).

According to an embodiment, in the case where the electronic device 901 executes any function or service automatically or in response to a request, the electronic device 901 may not perform the function or the service internally, but, alternatively and additionally, it may request at least a part of a function associated with the electronic device 901 at an external other device (e.g., the first or second external electronic device 902 or 904 or the server 906). The external other electronic device (e.g., the first or second external electronic device 902 or 904 or the server 906) may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
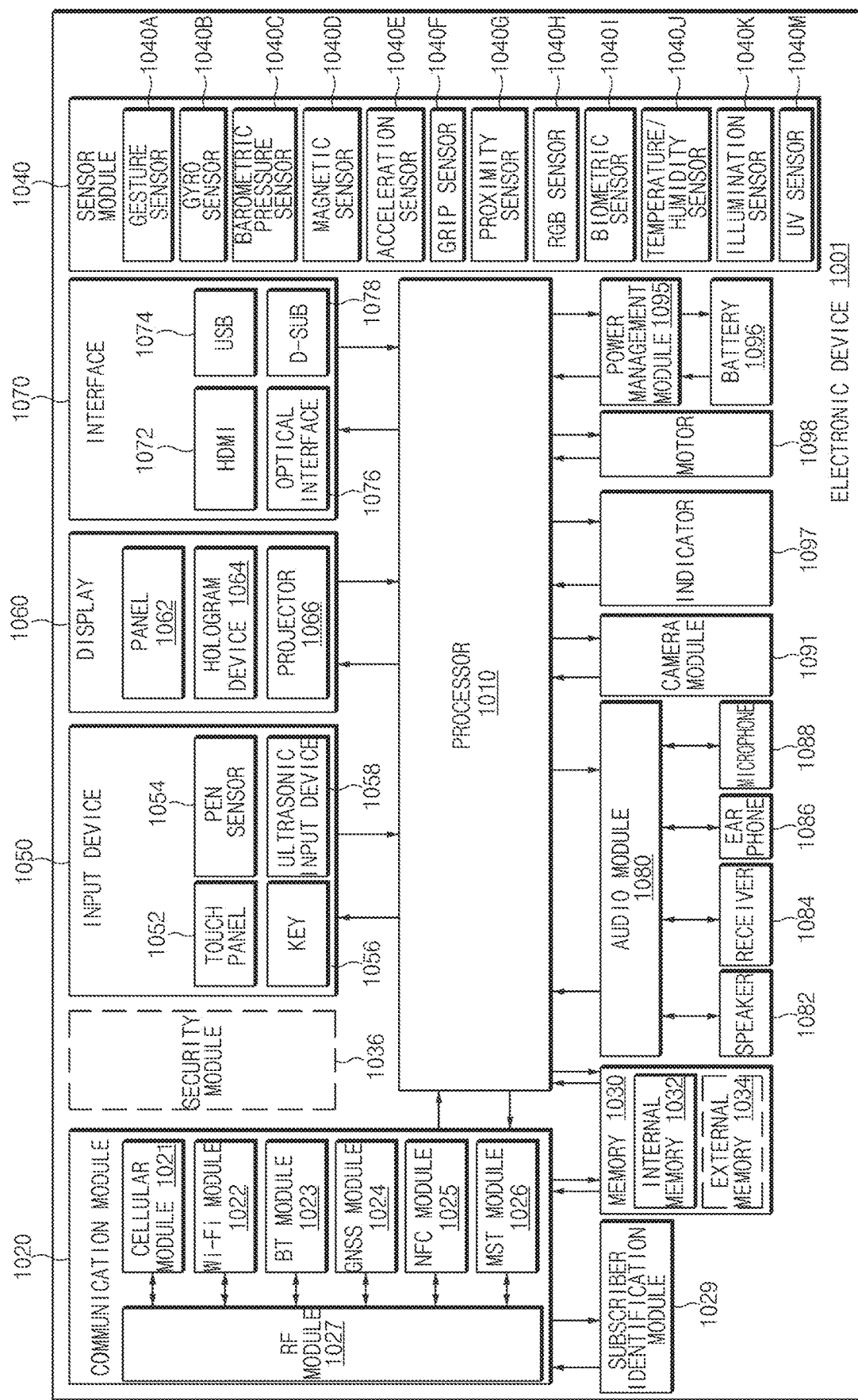
FIG. 10 is a block diagram of an electronic device according to an embodiment of the present disclosure.

FIG. 10 is a block diagram of an electronic device according to an embodiment of the present disclosure.

An electronic device 1001 may include, for example, all or a part of the electronic device 100 illustrated in FIG. 4. The electronic device 1001 may include one or more processors (e.g., an AP) 1010, a communication module 1020, a subscriber identification module 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive an OS or an application program to control a plurality of hardware or software elements connected to the processor 1010 and may process and compute a variety of data. The processor 1010 may be implemented with a SoC, for example. According to an embodiment, the processor 1010 may further include a GPU and/or an image signal processor (ISP). The processor 1010 may include at least a part (e.g., a cellular module 1021) of elements illustrated in FIG. 10. The processor 1010 may load and process an instruction or data, which is received from at least one of other components (e.g., a nonvolatile memory), and may store a variety of data at a nonvolatile memory.

The communication module 1020 may be configured the same as or similar to the communication interface 970 of FIG. 9. The communication module 1020 may include the cellular module 1021, a Wi-Fi module 1022, a BT module 1023, a GNSS module 1024 (e.g., a GPS module, a GLONASS module, a Beidou module, or a Galileo module), an NFC module 1025, an MST module 1026, and a radio frequency (RF) module 1027.

The cellular module 1021 may provide voice communication, video communication, a character service, an Internet service, or the like through a communication network. According to an embodiment, the cellular module 1021 may perform discrimination and authentication of the electronic device 1001 within a communication network using a subscriber identification module 1029 (e.g., a SIM card), for example. According to an embodiment, the cellular module 1021 may perform at least a part of functions that the processor 1010 provides. According to an embodiment, the cellular module 1021 may include a CP.

Each of the Wi-Fi module 1022, the BT module 1023, the GNSS module 1024, the NFC module 1025, and the MST module 1026 may include a processor for processing data exchanged through a corresponding module, for example. According to an embodiment, at least a part (e.g., two or more components) of the cellular module 1021, the Wi-Fi module 1022, the BT module 1023, the GNSS module 1024, the NFC module 1025, or the MST module 1026 may be included within one Integrated Circuit (IC) or an IC package.

The RF module 1027 may transmit and receive, for example, a communication signal (e.g., an RF signal). For example, the RF module 1027 may include a transceiver, a power amplifier module (PAM), a frequency filter, a low noise amplifier (LNA), an antenna, and the like. According to various embodiments, at least one of the cellular module 1021, the Wi-Fi module 1022, the HT module 1023, the GNSS module 1024, or the NFC module 1025, or the MST module 1026 may transmit and receive an RF signal through a separate RF module.

The subscriber identification module 1029 may include, for example, a subscriber identification module and may include unique identify information (e.g., integrated circuit card identifier (ICCID)) or subscriber information (e.g., integrated mobile subscriber identity (IMSI)).

The memory 1030 may include, for example, an internal memory 1032 and/or an external memory 1034. For example, the internal memory 1032 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, and a solid state drive (SSD).

The external memory 1034 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1034 may be functionally and/or physically connected with the electronic device 1001 through various interfaces.

Security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or an SD card, which is removable, or may include an (eSE) embedded in a fixed chip of the electronic device 1001. Furthermore, the security module 1036 may operate based on an OS that is different from the OS of the electronic device 1001. For example, the security module 1036 may operate based on a java card open platform (JCOP) OS. The sensor module 1040 may measure, for example, a physical quantity or may detect an operation state of the electronic device 1001. The sensor module 1040 may convert the measured or detected information to an electric signal. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., red, green, blue (RGB) sensor), a living body (e.g., biometric) sensor 1040I, a temperature/humidity sensor 1040J, an illumination sensor 1040K, or a UV sensor 1040M. Even though not illustrated, additionally or alternatively, the sensor module 1040 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment of the present disclosure, the electronic device 1001 may further include a processor which is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, and/or an ultrasonic input unit 1058. The touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, a keypad, and the like. The ultrasonic input device 1058 may detect (or sense) an ultrasonic signal, which is generated from an input device, through a microphone (e.g., a microphone 1088) and may check data corresponding to the detected ultrasonic signal.

The display 1060 may include a panel 1062, a hologram device 1064, and/or a projector 1066. For example, the panel 1062 may be implemented to be flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be arranged inside or outside the electronic device 1001. According to an embodiment of the present disclosure, the display 1060 may further include a control circuit for controlling the panel 1062, the hologram device 1064, and/or the projector 1066.

The interface 1070 may include, for example, an HDMI 1072, a USB 1074, an optical interface 1076, and/or a D-subminiature (D-sub) 1078. The interface 1070 may be included, for example, in the communication interface 970 illustrated in FIG. 9. Additionally or alternatively, the interface 1070 may include, for example, a mobile high definition link (MHL) interface, an SD card/MMC interface, or an infrared data association (IrDA) standard interface.

The audio module 1080 may convert a sound and an electric signal in dual directions. At least a part of elements of the audio module 1080 may process, for example, sound information that is input or output through a speaker 1082, a receiver 1084, an earphone 1086, or the microphone 1088.

The camera module 1091 for shooting a still image or a video may include, for example, at least one image sensor (e.g., a front sensor and a rear sensor), a lens, an ISP, or a flash (e.g., an LED or a xenon lamp)

The power management module 1095 may manage, for example, power of the electronic device 1001. According to an embodiment, the power management module 1095 may include a power management integrated circuit (PMIC), a charger IC, a battery, or fuel gauge. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, and the like. The battery gauge may measure, for example, a remaining capacity of the battery 1096, a voltage, a current, and temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate effects such as vibration, haptic, and the like. Although not illustrated, a processing device (e.g., a GPU) for supporting a mobile TV may be included in the electronic device 1001. The processing device for supporting a mobile TV may process media data according to the standards of DMB, digital video broadcasting (DVB), MediaFlo™, and the like.

Figure 11:
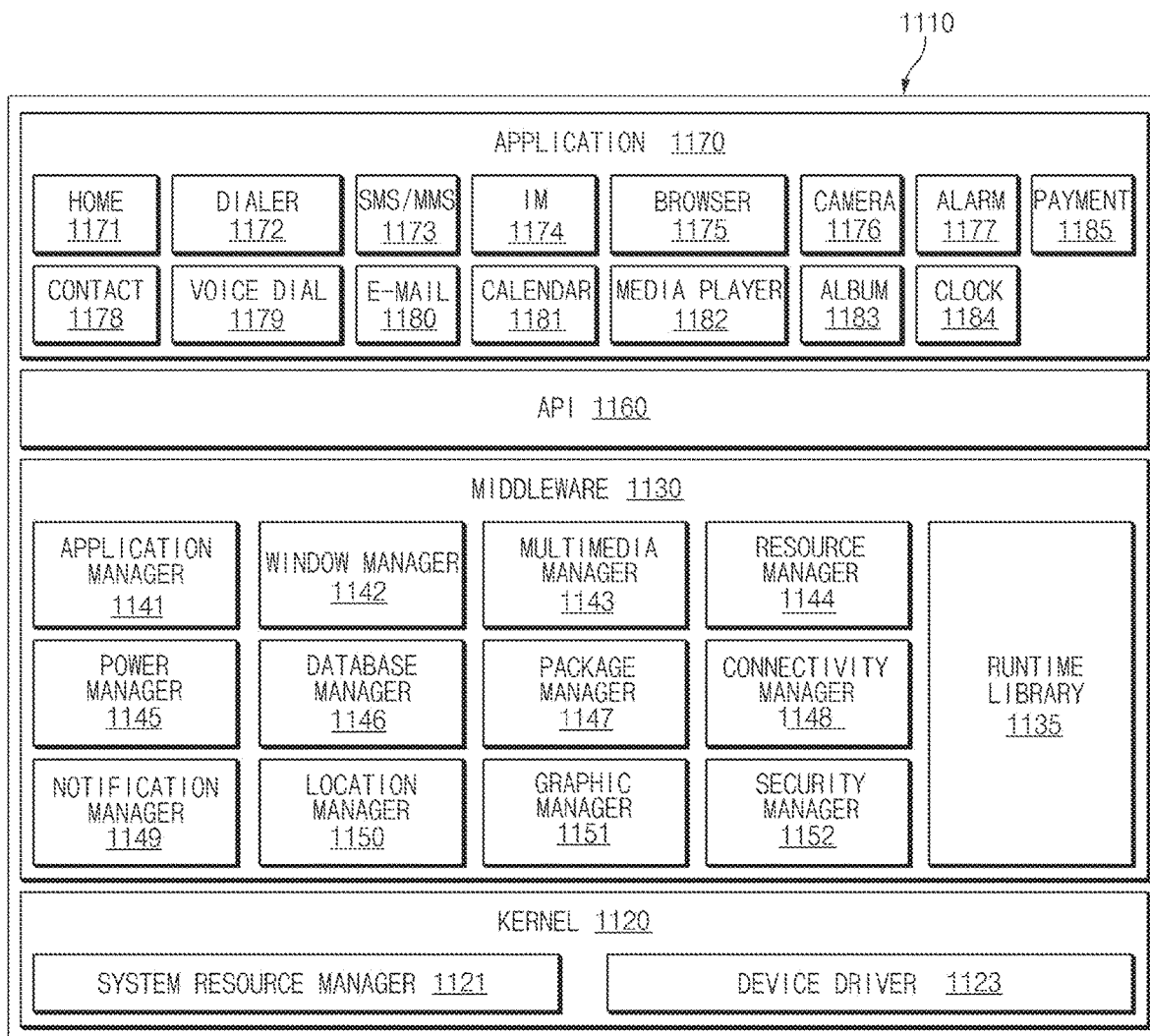
FIG. 11 is a block diagram of a program module according to an embodiment of the present disclosure.

FIG. 11 is a block diagram of a program module according to an embodiment of the present disclosure.

Referring to FIG. 11, a program module 1110 (e.g., the program 940 in FIG. 9) may include an OS to control resources associated with an electronic device (e.g., the electronic device 901 in FIG. 9), and/or diverse applications (e.g., the application program 947 in FIG. 9) driven on the OS. The OS may be, for example, android, iOS, windows, symbian, tizen, or bada.

The program module 1110 may include a kernel 1120, a middleware 1130, an API 1160, and/or an application 1170. At least a part of the program module 1110 may be preloaded on an electronic device or may be downloadable from an external electronic device (e.g., the first or second external electronic device 902 or 904, the server 906, and the like).

The kernel 1120 (e.g., the kernel 941) may include, for example, a system resource manager 1121 and/or a device driver 1123. The system resource manager 1121 may perform control, allocation, or retrieval of system resources. According to an embodiment, the system resource manager 1121 may include a process managing unit, a memory managing unit, or a file system managing unit. The device driver 1123 may include, for example, a display driver, a camera driver, a BT driver, a common memory driver, a USB driver, a keypad driver, a Wi-Fi driver, an audio driver, or an inter-process communication (IPC) driver.

The middleware 1130 may provide, for example, a function which the application 1170 needs in common, or may provide diverse functions to the application 1170 through the API 1160 to allow the application 1170 to efficiently use limited system resources of the electronic device. According to an embodiment, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include, for example, a library module which is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a GUI resource which is used in a screen. The multimedia manager 1143 may identify a format necessary for playing diverse media files, and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify a database which is to be used in at least one application of the application 1170. The package manager 1147 may install or update an application that is distributed in the form of a package file.

The connectivity manager 1148 may manage, for example, wireless connection such as Wi-Fi or BT. The notification manager 1149 may display or notify an event such as an arrival message, appointment, or proximity notification in a mode that does not disturb a user. The location manager 1150 may manage location information of an electronic device. The graphic manager 1151 may manage a graphic effect that is provided to a user, or manage a user interface relevant thereto. The security manager 1152 may provide a general security function necessary for system security or user authentication. According to an embodiment, in the case where an electronic device (e.g., the electronic device 1100) includes a telephony function, the middleware 1130 may further includes a telephony manager for managing a voice or video call function of the electronic device.

The middleware 1130 may include a middleware module that combines diverse functions of the above-described components. The middleware 1130 may provide a module specialized to each OS kind to provide differentiated functions. Additionally, the middleware 1130 may remove a part of the preexisting components, dynamically, or may add a new component thereto.

The API 1160 (e.g., the API 945) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 1170 (e.g., the application program 947) may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a clock 1184, and a payment 1185 or for offering health care (e.g., measuring an exercise quantity or blood sugar) or environment information (e.g., information of barometric pressure, humidity, or temperature).

According to an embodiment, the application 1170 may include an application (hereinafter referred to as "information exchanging application" for descriptive convenience) to support information exchange between the electronic device (e.g., the electronic device 901) and an external electronic device (e.g., the first or second external electronic device 902 or 904). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the first or second external electronic device 902 or 904). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the first or second external electronic device 902 or 904) which communicates with the electronic device, an application running in the external electronic device, and/or a service (e.g., a call service, a message service, or the like) provided from the external electronic device.

According to an embodiment, the application 1170 may include an application (e.g., a health care application) which is assigned in accordance with an attribute (e.g., an attribute of a mobile medical device as a kind of electronic device) of an external electronic device (e.g., the first or second external electronic device 902 or 904). According to an embodiment of the present disclosure, the application 1170 may include an application which is received from an external electronic device (e.g., the server 906 or the first or second external electronic device 902 or 904 of FIG. 10). According to an embodiment, the application 1170 may include a preloaded application or a third party application which is downloadable from a server. The component titles of the program module 1110 according to the embodiment may be modifiable depending on kinds of operating systems.

According to various embodiments, at least a part of the program module 1110 may be implemented by software, firmware, hardware, or a combination of two or more thereof. At least a portion of the program module 1110 may be implemented (e.g., executed), for example, by the processor (e.g., the processor 160). At least a portion of the program module 1110 may include, for example, a module, a program, a routine, sets of instructions, or a process for performing one or more functions.

Each of the above-mentioned elements of the electronic device according to various embodiments of the present disclosure may be configured with one or more components, and the names of the elements may be changed according to the type of the electronic device. According to various embodiments, the electronic device may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit," "logic," "logical block," "component," and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of the present disclosure may be, for example, implemented by instructions stored in a non-transitory computer-readable recording medium in the form of a program module. The instruction, when executed by one or more processors (e.g., the processor 160 of FIG. 4), may cause the one or more processors to perform a function corresponding to the instruction.

A non-transitory computer-readable recording medium may include a hard disk, a magnetic media, a floppy disk, a magnetic media (e.g., a magnetic tape), an optical media (e.g., a compact disc read only memory (CD-ROM) and a DVD, a magneto-optical media (e.g., a floptical disk), and hardware devices (e.g., a read only memory (ROM), a random access memory (RAM), or a flash memory). Also, a program instruction may include not only a mechanical code, such as things generated by a compiler, but also a high-level language code executable on a computer using an interpreter. The above-mentioned hardware device may be configured to operate as one or more software modules to perform operations according to various embodiments of the present disclosure, and vice versa.

A non-transitory computer-readable recording medium according to an embodiment of the present disclosure may have recorded thereon a method to be executed by a processor. The method may include selecting at least one authentication server of a plurality of authentication servers based on payment information registered in a payment application, receiving authentication information from the at least one authentication server, selecting at least one payment information of the payment information registered in the payment application based on a user input, selecting first authentication information, which corresponds to the selected payment information, from among the authentication information, and sending second authentication information generated based on the selected first authentication information to the at least one authentication server corresponding to the selected first authentication information.

A non-transitory computer-readable recording medium according to an embodiment of the present disclosure may have recorded thereon a method to be executed by a processor. The method may include executing a payment application, storing first authentication information corresponding to first payment information registered in the payment application and second authentication information corresponding to second payment information registered in the payment application, selecting one payment information of the first payment information and the second payment information through the payment application based on a user input, selecting authentication information, which corresponds to the selected payment information, from among the first authentication information and the second authentication information, generating third authentication information based on the selected authentication information, and sending the third authentication information to an authentication server corresponding to the selected authentication information.

A module or a program module according to various embodiments may include at least one or more of the above-mentioned elements, some of the above-mentioned elements may be omitted, or other additional elements may be further included therein. Operations executed by modules, program modules, or other elements may be executed by a successive method, a parallel method, a repeated method, or a heuristic method. Also, a part of operations may be executed in different sequences, omitted, or other operations may be added.

According to various embodiments of the present disclosure, an electronic device may perform user authentication by previously receiving and storing a challenge value during user authentication. Moreover, the electronic device may effectively manage the challenge value by using mapping information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile device in a network environment, the mobile device comprising:
    a communication interface;
    a processor; and
    a memory storing a payment application and one or more computer programs including instructions which, when executed by the processor, cause the processor to:
        execute the payment application,
        in response to executing the payment application, select a plurality of authentication servers among authentication servers of the network environment based on card information of the payment application,
        request a challenge value from each of the plurality of authentication servers,
        based on the requesting of the challenge value, receive the challenge value from each of the plurality of authentication servers,
        in response to the receiving of the challenge value, select a first card based on a user input,
        select a first challenge value from among the received challenge values based on the user input, the first challenge value corresponding to the first card,
        in response to the selecting of the first challenge value, perform an authentication of a user,
        generate first authentication information by encrypting the first challenge value based on an encryption key associated with the authentication, when the authentication is successful, and
        transmit, to a first authentication server corresponding to the first challenge value, the first authentication information.

2. The mobile device of claim 1, wherein the instructions, when executed by the processor, further cause the processor to:
    perform biometric authentication corresponding to the first challenge value as the authentication of the user, and
    based on the biometric authentication being successful, encrypt the first challenge value by using the encryption key associated with the biometric authentication.

3. The mobile device of claim 1, wherein the instructions, when executed by the processor, further cause the processor to receive a validity period of challenge value information with the challenge value from each of the plurality of authentication servers.

4. The mobile device of claim 1, wherein the instructions, when executed by the processor, further cause the processor to:
    when the mobile device receives first mapping information from a payment server, the first mapping information including information in which information about a finance company and information about an authentication server associated with the finance company are mapped,
    store the first mapping information in the memory, and
    select the first authentication server by using the first mapping information.

5. The mobile device of claim 4, wherein the instructions, when executed by the processor, further cause the processor to:
    identify the finance company associated with the selected first card, and
    select the authentication server mapped to the finance company.

6. The mobile device of claim 5, wherein the instructions, when executed by the processor, further cause the processor to select all cards including the first card, and wherein the first card is registered in the payment application.

7. The mobile device of claim 5, wherein the instructions, when executed by the processor, further cause the processor to select at least one card among a plurality of cards registered in the payment application based on at least one of a latest use record, a frequency of use of each card, a current location of the mobile device, or a current time.

8. The mobile device of claim 5, further comprising:
    a display,
    wherein the instructions, when executed by the processor, further cause the processor to:
        arrange cards including the first card registered in the payment application on the display,
        display a user interface including a portion of the arranged cards on the display,
        change the portion of the arranged cards included in the user interface into a different portion of the arranged cards based on an order of arrangement, and
        select a second card based on a direction.

9. The mobile device of claim 8, wherein the instructions, when executed by the processor, further cause the processor to arrange cards registered in the payment application based on at least one of a priority set by the user, a use record of each card, a type of the payment application, or a current location of the mobile device.

10. The mobile device of claim 4, wherein the instructions, when executed by the processor, further cause the processor to, in response to receiving updated first mapping information from the payment server, update the first mapping information stored in the memory by using the updated first mapping information received from the payment server.

11. The mobile device of claim 1, wherein the instructions, when executed by the processor, further cause the processor to:
    generate second mapping information by mapping the first authentication information, information about an authentication server sending the first authentication information, and information about a finance company, and
    store the second mapping information in the memory.

12. The mobile device of claim 11, wherein the instructions, when executed by the processor, further cause the processor to select the first authentication information corresponding to a card selected by using the second mapping information.

13. The mobile device of claim 12, wherein the instructions, when executed by the processor, further cause the processor to identify the authentication server corresponding to the first authentication information selected by using the second mapping information.

14. A mobile device in a network environment, the mobile device comprising:
a communication interface;
a processor; and
a memory storing a first challenge value corresponding to first payment information of a payment application, a second challenge value corresponding to second payment information of the payment application, and one or more computer programs including instructions which, when executed by the processor, cause the processor to:
execute the payment application,
in response to executing the payment application, receive the first challenge value and the second challenge value from a first authentication server and a second authentication server, respectively, among authentication servers of the network environment, the first challenge value and the second challenge value being stored in the memory,
select one payment information among the first payment information and the second payment information through the payment application based on a user input,
in response to the selecting of the one payment information, select one of the first challenge value or the second challenge value based on the user input, the selected challenge value corresponding to the one payment information,
in response to selecting one of the first challenge value or the second challenge value, perform an authentication of a user,
generate first authentication information by encrypting one of the first challenge value or the second challenge value based on an encryption key associated with the authentication, when the authentication is successful, and
transmit the first authentication information to an authentication server corresponding to the selected challenge value.

15. The mobile device of claim 14, wherein the instructions, when executed by the processor, further cause the processor to:

perform biometric authentication corresponding to the selected challenge value as the authentication of the user, and
based on the biometric authentication being successful, generate the first authentication information by encrypting the selected challenge value based on the encryption key associated with the biometric authentication.

16. The mobile device of claim 14, wherein the instructions, when executed by the processor, further cause the processor to:
in response to a validity period of the first challenge value or the second challenge value expiring, transmit a request message to one of the first authentication server or the second authentication server to request a challenge value, and
in response to receiving a new challenge value from one of the first authentication server or the second authentication server, update the first challenge value or the second challenge value by using the new challenge value.

17. A non-transitory computer-readable recording medium having recorded thereon instructions which, when executed by a processor of a mobile device in a network environment, cause the processor to perform a method comprising:
executing a payment application;
in response to executing the payment application, selecting a plurality of authentication servers among authentication servers of the network environment based on payment information of the payment application;
requesting a challenge value from the plurality of authentication servers;
based on the requesting of the challenge value, receiving the challenge value from each of the plurality of authentication servers;
in response to the receiving of the challenge value, selecting a first card based on a user input;
in response to the selecting of the first card, selecting a first challenge value from among the received challenge values based on the user input, the first challenge value corresponding to the first card;
performing an authentication of a user, the authentication corresponding to the first challenge value;
generating first authentication information by encrypting the first challenge value based on an encryption key associated with the authentication, when the authentication is successful; and
transmitting the first authentication information to a first authentication server corresponding to the first challenge value.

\* \* \* \* \*